(12) United States Patent
Macfarlane et al.

(10) Patent No.: US 6,271,920 B1
(45) Date of Patent: Aug. 7, 2001

(54) METHODS AND APPARATUS FOR COLOR CALIBRATION AND VERIFICATION

(75) Inventors: Darby S. Macfarlane; David K. Macfarlane, both of Hastings-on-Hudson; Fred W. Billmeyer, Jr., Schenectady, all of NY (US)

(73) Assignee: Chromatics Color Sciences International, Inc., New York, NY (US)

( * ) Notice: Subject to any disclaimer, the term of this patent is extended or adjusted under 35 U.S.C. 154(b) by 0 days.

(21) Appl. No.: 09/215,907

(22) Filed: Dec. 18, 1998

Related U.S. Application Data

(63) Continuation-in-part of application No. 08/995,286, filed on Dec. 19, 1997, now abandoned.

(51) Int. Cl.[7] ........................................ G01J 3/52
(52) U.S. Cl. .................. 356/402; 356/422; 356/423; 356/243.5
(58) Field of Search ................... 356/402, 406, 356/407, 408, 421, 422, 423, 424, 425, 243.1, 243.5; 702/85

(56) References Cited

U.S. PATENT DOCUMENTS

| | | |
|---|---|---|
| 517,367 | 3/1894 | Spence . |
| 1,353,500 | 9/1920 | Spindler . |
| 1,456,964 | 5/1923 | Bock et al. . |
| 1,496,374 | 6/1924 | Jones . |
| 1,582,122 | 4/1926 | Clapp . |
| 1,745,537 | 2/1930 | Hartness . |
| 1,802,007 | 4/1931 | Durfee . |

(List continued on next page.)

FOREIGN PATENT DOCUMENTS

| | | |
|---|---|---|
| 29 16 061 | 11/1979 | (DE) . |
| 38 27 457 | 8/1988 | (DE) . |
| 42 08 707 C1 | 6/1993 | (DE) . |
| 0 128 442 A2 | 12/1984 | (EP) . |
| 0 180 368 A2 | 5/1986 | (EP) . |
| 0 573 069 A1 | 12/1993 | (EP) . |
| 0 594 134 A2 | 4/1994 | (EP) . |
| 0 655 221 A1 | 5/1995 | (EP) . |

(List continued on next page.)

OTHER PUBLICATIONS

U.S. Patent Appl. No. 08/904,766 (filed Aug. 1, 1997).
U.S. Patent Appl. No. 09/054,490 (filed Apr. 3, 1998).
U.S. Patent Appl. No. 09/124,090 (filed Jul. 29, 1998).
James T. DeGroff, "LED Technology in Color Instrument Design," presented at AIC Interim Meeting, Berlin, Colorimetry, Sep. 3–6, 1995.
Robert Eade, "Color Testing Moves from Lab to Line," *Quality*, Mar. 1995, pp. 36–38.

(List continued on next page.)

*Primary Examiner*—F L Evans
(74) *Attorney, Agent, or Firm*—Fish & Neave

(57) ABSTRACT

Methods and apparatus for calibrating a color measuring instrument with a color standard and verifying the color standard and calibration are provided. One method includes providing a color standard having a surface with at least two different colors (preferably arranged for a simultaneous color measurement), calibrating the instrument, and verifying that said color standard is an authorized color standard of a predetermined specification and that the calibration of the color measuring instrument has achieved predetermined specified results. Some of the provided methods and apparatus use a photosensitive portion of the color standard that changes color in a known way when exposed to a predetermined dose of light. Various color standards for use with this invention are provided.

225 Claims, 17 Drawing Sheets

U.S. PATENT DOCUMENTS

| | | |
|---|---|---|
| 1,905,251 | 4/1933 | Styer . |
| 2,022,327 | 11/1935 | Sheldon . |
| 2,312,488 | 3/1943 | Rowland . |
| 2,363,773 | 11/1944 | Cargille . |
| 2,437,916 | 3/1948 | Greenwald . |
| 2,809,552 | 10/1957 | Ciavola . |
| 2,864,279 | 12/1958 | Phifer . |
| 3,003,388 | 10/1961 | Hunter et al. . |
| 3,176,577 | 4/1965 | Frank . |
| 3,193,677 | 7/1965 | McHenry . |
| 3,520,626 | 7/1970 | Hach . |
| 3,569,721 | 3/1971 | Goldberg et al. . |
| 3,627,431 | 12/1971 | Komarniski . |
| 3,649,199 | 3/1972 | Littlejohn . |
| 3,668,401 | 6/1972 | Shah et al. . |
| 3,669,554 | 6/1972 | Horer et al. ............... 356/244 |
| 3,702,734 | 11/1972 | Lindahl et al. ............... 356/38 |
| 3,765,775 | 10/1973 | Ganssle et al. . |
| 3,773,425 | 11/1973 | Bentley . |
| 3,803,414 | 4/1974 | Van Horne et al. . |
| 3,806,259 | 4/1974 | Boostrom et al. ............... 356/244 |
| 3,807,390 | 4/1974 | Ostrowski et al. . |
| 3,910,701 | 10/1975 | Henderson et al. ............... 356/39 |
| 3,922,095 | 11/1975 | Lee ............... 356/225 |
| 3,935,436 | 1/1976 | Holschlag et al. . |
| 3,942,899 | 3/1976 | Longhenry . |
| 3,973,129 | 8/1976 | Blumberg et al. . |
| 3,999,866 | 12/1976 | Mathisen ............... 356/244 |
| 3,999,948 | 12/1976 | Deindoerfer et al. . |
| 4,029,085 | 6/1977 | DeWitt et al. . |
| 4,050,450 | 9/1977 | Polanyi et al. . |
| 4,093,991 | 6/1978 | Christie, Jr. et al. . |
| 4,177,798 | 12/1979 | Lèvêque et al. . |
| 4,213,462 | 7/1980 | Sato . |
| 4,241,738 | 12/1980 | Lübbers et al. . |
| 4,267,844 | 5/1981 | Yamanishi . |
| 4,322,164 | 3/1982 | Shaw et al. . |
| 4,344,438 | 8/1982 | Schultz . |
| 4,360,270 | 11/1982 | Jeck . |
| 4,398,541 | 8/1983 | Pugliese . |
| 4,423,736 | 1/1984 | DeWitt et al. . |
| 4,458,323 | 7/1984 | Willis et al. . |
| 4,527,062 | 7/1985 | Novinson . |
| 4,528,986 | 7/1985 | Arundel et al. . |
| 4,621,643 | 11/1986 | New, Jr. et al. . |
| 4,648,051 | 3/1987 | Wandell et al. . |
| 4,650,327 | 3/1987 | Ogi . |
| 4,654,794 | 3/1987 | O'Brien . |
| 4,655,225 | 4/1987 | Dähne et al. . |
| 4,663,959 | 5/1987 | Rogge et al. ............... 73/1 G |
| 4,672,973 | 6/1987 | Hofke . |
| 4,673,653 | 6/1987 | Guigan ............... 436/8 |
| 4,700,708 | 10/1987 | New, Jr. et al. . |
| 4,705,046 | 11/1987 | Robillard . |
| 4,723,554 | 2/1988 | Oman et al. . |
| 4,725,147 | 2/1988 | Stoddart ............... 356/433 |
| 4,744,656 | 5/1988 | Moran et al. . |
| 4,768,516 | 9/1988 | Stoddart et al. . |
| 4,770,179 | 9/1988 | New, Jr. et al. . |
| 4,795,254 | 1/1989 | Kravetz . |
| 4,796,633 | 1/1989 | Zwirkoski . |
| 4,852,025 | 7/1989 | Herpichböhm . |
| 4,867,557 | 9/1989 | Takatani et al. ............... 356/41 |
| 4,894,547 | 1/1990 | Leffell et al. ............... 250/461.2 |
| 4,981,355 | 1/1991 | Higgins . |
| 4,981,361 | 1/1991 | Kobayashi et al. . |
| 4,989,983 | 2/1991 | Terada et al. . |
| 4,997,769 | 3/1991 | Lundsgaard ............... 436/66 |
| 5,013,920 | 5/1991 | Asano et al. . |
| 5,016,173 | 5/1991 | Kenet et al. . |
| 5,088,493 | 2/1992 | Giannini et al. . |
| 5,098,545 | 3/1992 | Patko ............... 204/403 |
| 5,119,819 | 6/1992 | Thomas et al. . |
| 5,137,364 | 8/1992 | McCarthy ............... 356/402 |
| 5,146,091 | 9/1992 | Knudson . |
| 5,157,455 | 10/1992 | Macri et al. . |
| 5,177,694 | 1/1993 | Graham et al. . |
| 5,208,649 | 5/1993 | Cuppoletti et al. ............... 356/244 |
| 5,251,006 | 10/1993 | Honigs et al. ............... 356/319 |
| 5,259,382 | 11/1993 | Kronberg . |
| 5,311,273 | 5/1994 | Tank et al. ............... 356/43 |
| 5,311,293 | 5/1994 | MacFarlane et al. ............... 356/421 |
| 5,313,267 | 5/1994 | MacFarlane et al. ............... 356/405 |
| 5,313,941 | 5/1994 | Braig et al. . |
| 5,337,745 | 8/1994 | Benaron . |
| 5,349,961 | 9/1994 | Stoddart et al. . |
| 5,353,790 | 10/1994 | Jacques et al. . |
| 5,355,880 | 10/1994 | Thomas et al. . |
| 5,360,004 | 11/1994 | Purdy et al. . |
| 5,365,925 | 11/1994 | Lee . |
| 5,369,481 | 11/1994 | Berg et al. ............... 356/319 |
| 5,369,494 | 11/1994 | Bowden et al. ............... 356/402 |
| 5,383,452 | 1/1995 | Buchert . |
| 5,399,856 | 3/1995 | Sandridge et al. ............... 250/252.1 |
| 5,435,309 | 7/1995 | Thomas et al. . |
| 5,458,140 | 10/1995 | Eppstein et al. . |
| 5,459,677 | 10/1995 | Kowalski et al. . |
| 5,616,823 | 4/1997 | Lattimore ............... 73/1.03 |
| 5,642,189 | 6/1997 | Alguard . |
| 5,671,735 | 9/1997 | MacFarlane et al. . |
| 5,680,220 | 10/1997 | Delignieres et al. ............... 356/406 |
| 5,792,049 | 8/1998 | Eppstein et al. ............... 600/306 |
| 5,860,421 | 1/1999 | Eppstein et al. . |
| 5,924,981 | 7/1999 | Rothfritz et al. ............... 600/306 |
| 6,002,482 | 12/1999 | Rothfritz et al. ............... 356/351 |

FOREIGN PATENT DOCUMENTS

| | | |
|---|---|---|
| 0 444 689 B1 | 12/1995 | (EP) . |
| 563227 | 11/1923 | (FR) . |
| 2 307 295 | 10/1997 | (GB) . |
| 59-20824 | 2/1984 | (JP) . |
| 60-37896 | 8/1985 | (JP) . |
| 63-206655 | 8/1988 | (JP) . |
| 3-199927 | 8/1991 | (JP) . |
| 5-176917 | 7/1993 | (JP) . |
| 9-122128 | 5/1997 | (JP) . |
| 8401665 | 12/1985 | (NL) . |
| 2001595 C1 | 10/1993 | (RU) . |
| WO 85/03575 | 8/1985 | (WO) . |
| WO 95/31930 | 11/1995 | (WO) . |
| WO 96/41139 | 12/1996 | (WO) . |
| WO 96/41140 | 12/1996 | (WO) . |
| WO 99/05961 | 2/1999 | (WO) . |

OTHER PUBLICATIONS

Renato Marchesini et al., "Extinction and absorption coefficients and scattering phase functions of human tissues in vitro," *Applied Optics*, vol. 28, No. 12, Jun. 15, 1989, pp. 2318–2324.

"Color management Systems Welcome X–Rite® Colorimeter," *X–Rite News Release*, Sep. 14, 1994.

"Color matching moves to production line with cost–effective portable spectrophotometers," Plasticscope, *Modern Plastics*, May 1995, pp. 28–29.

"Precise Color Communication, Color Control from Feeling to Instrumentation," Minolta Information Brochure, Japan 1994.

"The New Handheld CRT Colorimeter That's Lab–Grade Precise and Affordable," Graseby Optronics, Orlando FL.

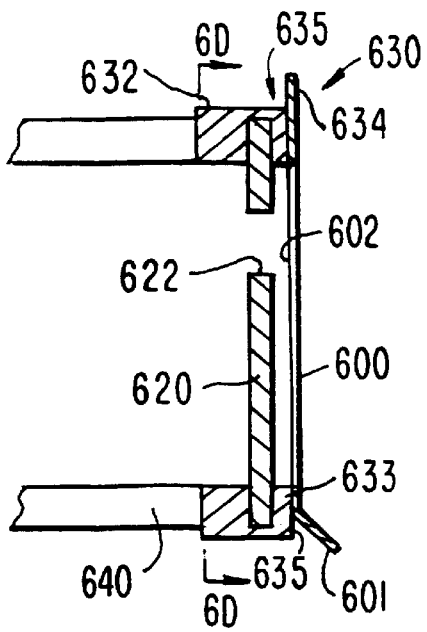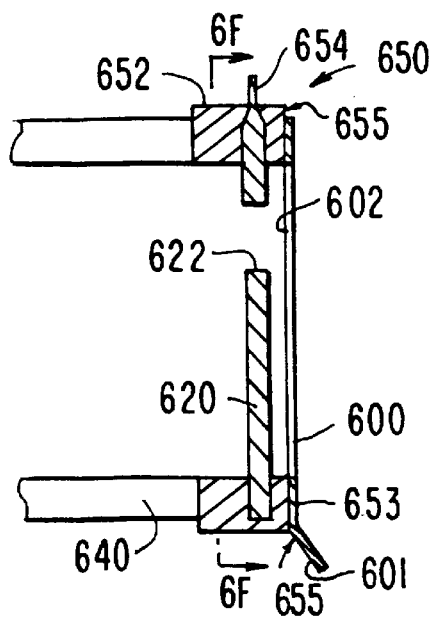

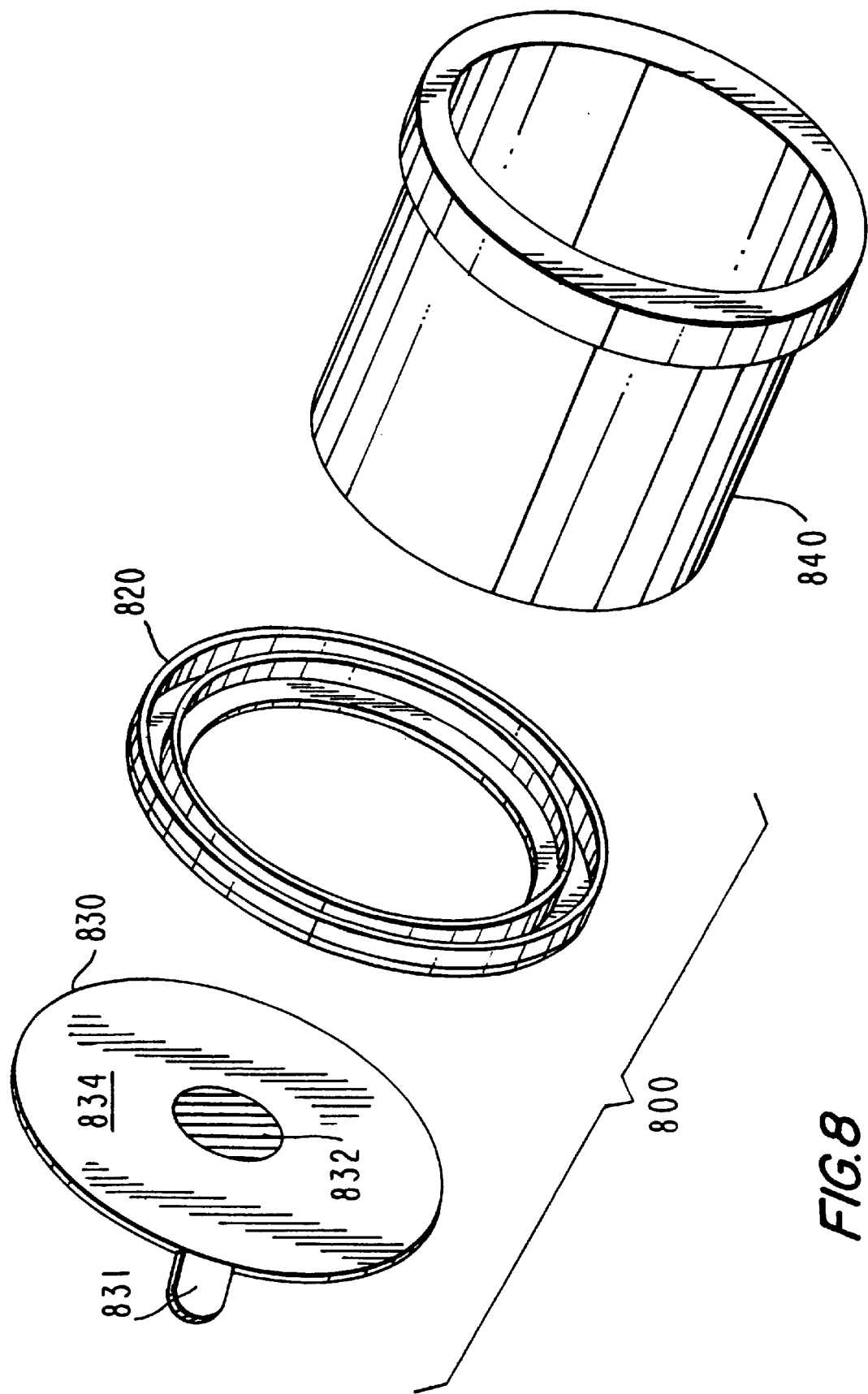

METHODS AND APPARATUS FOR COLOR CALIBRATION AND VERIFICATION

CROSS-REFERENCE TO RELATED APPLICATION

This is a continuation-in-part of U.S. patent application Ser. No. 08/995,286, filed Dec. 19, 1997, now abandoned.

BACKGROUND OF THE INVENTION

This invention relates to color measuring instruments and, in particular, to methods and apparatus for calibrating and verifying the calibration of color measuring instruments that are suitable for measuring the color of a surface, including human skin.

It is well known that color measuring instruments, such as colorimeters and spectrophotometers, can be used to measure the color of surfaces for a variety of useful applications. For example, Macfarlane et al. U.S. Pat. No. 5,313,267 describes a method and instrument for selecting personal compatible colors using a color measuring device. Also, PCT Publication No. WO 96/41140 describes methods and apparatus for determining the condition of a test subject based on color by using a color measuring instrument to detect change in a color factor indicative of a condition such as a disease, spoilage, ageing, etc. In particular, those methods and apparatus can be used to detect a medical condition known as hyperbilirubinemia by measuring skin color.

However, in order to ensure that the skin color measurements are accurate, they are usually preceded by conventional calibration and optionally conventional verification techniques. Such calibration can be performed by measuring a single color standard of predetermined coloration having premeasured color measurement value(s) and comparing the measurement value(s) with the premeasured value(s) to see that they are substantially the same. Once calibrated, the instrument is normally prepared to perform accurate color measurements producing color measurement value(s) that characterize the color of an unknown sample.

Additionally, further subsequent verification against a color standard that is different than that of the color standard used during calibration can help to ensure that the standard used to calibrate the color measuring instrument was an accurate and authorized color standard for its intended calibration and that calibration was performed according to predetermined specifications.

When color measuring instruments are used for medical applications, such as when they are used to detect abnormal medical conditions (including hyperbilirubinemia), the accuracy of the color standard used for calibration and verification is critical. However, color standards may be inaccurate because they have been inadvertently scratched and/or soiled by previous users or because they have become discolored, or faded, from atmospheric or electromagnetic radiation exposure. Furthermore, another reason for inaccuracy of the color standard includes poor quality control at the site where the color standard is manufactured. Poor quality control at the manufacturing site may yield unacceptable variability in coloration of a color standard (even though the color standard is new and unused). Moreover, color standards from unauthorized manufacturing sites may be mislabeled.

Furthermore, when a color measuring instrument is used to determine a medical condition, a portion of the instrument usually makes an optical seal on the surface of the patient's skin. In order to make the seal, however, that portion of the color measuring instrument normally makes physical contact with the skin. A disadvantage of such contact is that the contacting surface of the instrument could transfer germs between successive patients when a single color measuring instrument is used to make such measurements.

In view of the foregoing, it is an object of this invention to provide sanitary methods and apparatus for making color measurements of human skin among other uses for such an invention, such as measuring laboratory specimens.

It is yet another object of this invention to provide improved color calibration and verification methods and apparatus that can detect inaccurate or unauthorized color standards and inaccurate calibration of color measuring instruments.

It is another object of this invention to provide methods and apparatus for safely measuring medical conditions without the risk of germ transfer.

SUMMARY OF THE INVENTION

These and other objects of the invention are accomplished in accordance with the principles of the invention by providing methods and apparatus to ensure proper calibration and verification of calibration of color measuring instruments.

As used herein, the term "calibration" includes both conventional calibration and standardization techniques as defined by *Standard Terminology of Appearance* (ASTM definitions). Conventional color calibration is the finding and elimination of systematic errors of a color measurement instrument scale or method of measurement by use of material standard and techniques traceable to an authorized national or international measurement system. Standardization is the process of adjusting the instrument output to correspond to a previously established calibration using one or more specimens or reference materials.

A method of calibrating a color measuring instrument with a color standard and verifying the color standard and the calibration according to this invention can include the following steps. First, a color standard having a surface with at least two different colors is provided. Second, the color measuring instrument is calibrated. And third, the calibration of the color measuring instrument is verified.

The color standard used in a preferred embodiment is one having at least two different colors arranged for simultaneous color measurement to sequentially calibrate a color measuring instrument with first predetermined color measurement value(s) of the color standard and verify the calibration with at least second and different predetermined color measurement value(s) of the color standard, the color calibration and verification apparatus includes variance means to provide at least such first and second different color measurement values, the variance means being selected from the group consisting of: (1) sequential inclusion and exclusion of the predetermined color measurement value(s) of the predetermined color measurement value(s) of a portion of said colors, (2) sequential exclusion and inclusion of the predetermined color measurement value(s) of the predetermined color measurement value(s) of a portion of said colors, and (3) sequential unexposure and exposure of photosensitive paper or material which provides at least one of said colors or portion of said colors.

The color standard used in another preferred embodiment of this invention has a first color that is characterized by a first predetermined coloration having premeasured color measurement value(s) and a second color that is characterized by a second predetermined coloration having premeasured color measurement value(s). The color standard used in calibrating and verifying a color measuring instrument can include: (1) a first predetermined coloration's premeasured color measurement value(s), (2) a second predetermined coloration's premeasured color measurement value (s), or (3) any combination of the first and the second predetermined coloration's premeasured color measurement value(s).

Any portion, region, or section of the color standard can be photosensitive so that its color changes in a known way when exposed to a predetermined dose of light.

The surface of the color standard can be a single surface with two colors or, in another preferred embodiment, can be two separate surfaces with two respective colors. For example, a first color which is characterized by a first predetermined coloration having premeasured color measurement value(s) can be disposed on a first surface of the color standard and a second color (which is characterized by a second predetermined coloration having premeasured color measurement value(s)) can be disposed on a second surface of the color standard. The second surface can be the opposite side of the first surface.

When two or more colors are disposed on a single surface, the colors are preferably arranged for a simultaneous color measurement. A simultaneous color measurement according to this invention includes one color measurement of a single portion having two or more colors. Although the colors are preferably arranged so that a simultaneous color measurement can be made according to this invention, one or more of the colors can be measured separately or in combination. Furthermore, one or more simultaneous color measurements can be performed during a single calibration or verification.

Preferably, the color standard used according to this invention is substantially opaque or has a surface against the back of the color standard that is opaque.

Suitable color standards for skin color measurements for detecting conditions affecting hyperbilirubinemia can be chosen using skin color categories. Skin color categories are disclosed in Macfarlane et al. U.S. Pat. No. 5,671,735, Macfarlane et al. U.S. patent application Ser. No. 08/939,462, filed on Sep. 29, 1997, now abandoned, Macfarlane et al. U.S. patent application Ser. No. 08/939,588, filed on Sep. 29, 1997, now abandoned, Macfarlane et al. U.S. Pat. No. 6,129,664, Macfarlane et al. U.S. Pat. No. 6,157,445 and PCT Publication No. WO 96/41140 (which are hereby incorporated by reference in their entirety herein). By using combinations of these categories of colors as the colors described on color standard surface for the calibration or verification of the invention herein, it could in some cases provide greater accuracy in measuring the color of skins for detecting abnormal medical conditions, such as hyperbilirubinemia. Suitable color standards for hair color measurements can be chosen using hair color classifications. Hair color classifications are disclosed in Macfarlane et al. U.S. patent application Ser. No. 08/657,590, filed Jun. 7, 1996, and PCT Publication No. WO 96/41139 (which are hereby incorporated by reference in their entirety herein).

A color measuring instrument and a calibration and verification apparatus for calibrating and further verifying the calibration are also provided.

BRIEF DESCRIPTION OF THE DRAWINGS

FIG. 3 also shows a head of a color measuring instrument on which the apparatus can be mounted.

FIG. 4A also shows a head of a color measuring instrument on which the apparatus can be mounted.

FIG. 5A also shows a head of a color measuring instrument on which the apparatus can be mounted.

FIG. 6C is a side view of yet another illustrative embodiment of a calibration and verification apparatus that can be used with the color standard shown in FIG. 6A and the mask shown in FIG. 6B, in accordance with this invention.

FIG. 6D is a cross-sectional view of the calibration and verification apparatus taken from line 6D—6D of FIG. 6C, in accordance with this invention.

FIG. 6E is a side view of yet another illustrative embodiment of a calibration and verification apparatus that can be used with the color standard shown in FIG. 6A and the mask shown in FIG. 6B, in accordance with this invention.

FIG. 6F is a cross-sectional view of the calibration and verification apparatus taken from line 6F—6F of FIG. 6E, in accordance with this invention.

FIG. 8 is an exploded perspective view of still another illustrative embodiment of a calibration and verification apparatus, including a frame and a color standard, in accordance with this invention. FIG. 8 also shows a head of a color measuring instrument on which the apparatus can be mounted.

FIG. 9 also shows a head of a color measuring instrument on which the apparatus can be mounted.

FIG. 10 also shows a head of a color measuring instrument on which the apparatus can be mounted.

FIG. 11 also shows a head of a color measuring instrument on which the apparatus can be mounted.

FIG. 12 also shows a head of a color measuring instrument on which the apparatus can be mounted.

DETAILED DESCRIPTION OF THE PREFERRED EMBODIMENTS

Figure 1:
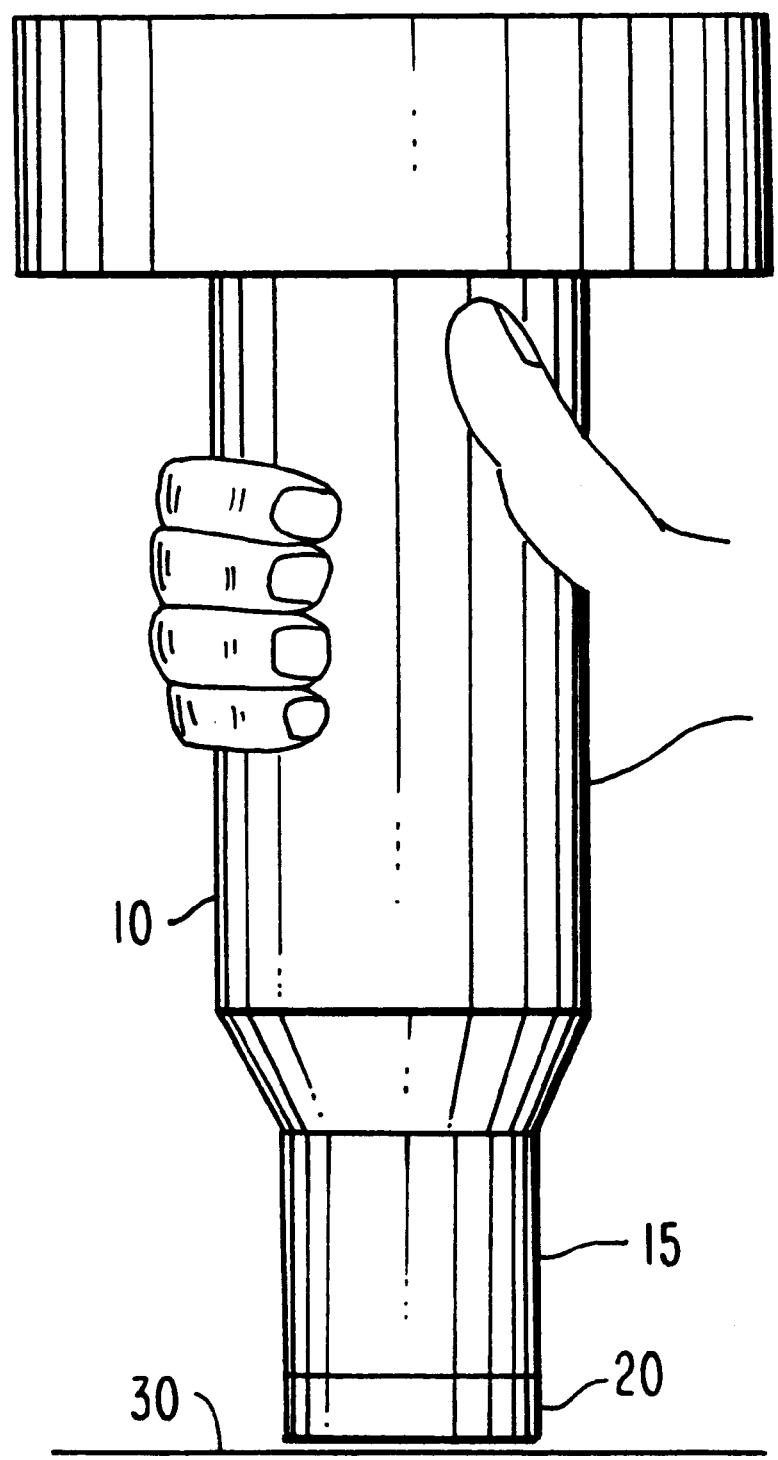
FIG. 1 is a simplified illustrative embodiment of a color measuring instrument being used with a calibration and verification apparatus against a surface of a sample of unknown colorization, in accordance with this invention.

According to one aspect of this invention, a color calibration and verification apparatus for calibrating and verifying the calibration of a color measuring instrument is provided. In one embodiment, the apparatus includes a color standard having a surface with at least two different colors arranged for a simultaneous color measurement. In another embodiment, the apparatus includes a color standard having a surface with at least a first region and a second region, wherein the first region has a first color characterized by a first predetermined coloration having premeasured color measurement value(s), and herein the second region is photosensitive and has a second color characterized by a second predetermined coloration having premeasured color measurement values prior to exposure to light and after exposure to light of a predetermined quantity, and is adequately photosensitive to allow a sufficient change in color by exposure to a predetermined quantity of light for the color measurement instrument to differentiate the color measurement values prior to exposure and after exposure to such light.

According to another aspect of this invention, color measuring instruments and methods for calibrating and verifying color measuring instruments are provided.

In one embodiment, a method for calibrating a color measuring instrument and verifying the calibration is provided. The method can include:
(a) providing a color standard having a substantially opaque surface with at least two different colors arranged for simultaneous color measurement;
(b) sequentially calibrating the instrument with first predetermined color measurement value(s) of the color standard and verifying the calibration with at least second and different predetermined color measurement value(s) of the color standard;
(c) providing variance means to provide said first and second different color measurement values, said variance means being selected from the group consisting of: (1) sequential inclusion and exclusion of predetermined color measurement value(s) of a portion of said colors, (2) sequential exclusion and inclusion of predetermined color measurement value(s) of a portion of said colors, and (3) sequential unexposure and exposure of photosensitive paper or material which provides at least one of said colors or region or portion of said colors;
(d) calibrating said instrument with said first predetermined color measurement value(s) of the color standard;
(e) causing the variance means to provide at least second and different predetermined color measurement value (s) of the color standard; and
(f) verifying the calibration of the color measurement instrument with said at least second and different predetermined color measurement value(s) of the color standard.

In another embodiment, a method for calibration of a color measuring instrument and verification of the calibration using a color calibration and verification apparatus is provided. An apparatus for use with the method includes: (a) a color standard having a substantially opaque surface with at least two different colors arranged for simultaneous color measurement to sequentially calibrate the instrument with first predetermined color measurement value(s) of the color standard and verify the calibration with at least second and different predetermined color measurement value(s) of the color standard, and (b) variance means to provide first and at least second different color measurement values, the variance means being selected from the group consisting of: (1) sequential inclusion and exclusion of predetermined color measurement value(s) of a portion of the colors, (2) sequential exclusion and inclusion of predetermined color measurement value(s) of the portion of the colors, and (3) sequential unexposure and exposure of photosensitive paper or material which provides at least one of the colors or portion of the colors. The method includes (a) calibrating the instrument with first predetermined color measurement value(s) of the color standard; (b) causing the variance means to provide at least second and different predetermined color measurement value(s) of the color standard; and (c) verifying the calibration of the color measurement instrument with at least second and different predetermined color measurement value(s) of the color standard.

The color measuring instrument for use with this method includes: (a) means for calibrating the instrument with first predetermined color measurement value(s) of the color standard; (b) means for causing the variance means to provide at least second and different predetermined color measurement value(s) of the color standard; and (c) means for verifying the calibration of the color measurement instrument with at least second and different predetermined color measurement value(s) of the color standard.

According to one aspect of this invention, calibrating can include at least measuring a known and predetermined portion of the color standard to obtain calibration color measurement value(s), and verifying can include at least measuring a second known portion to obtain verification color measurement value(s). When the first and second known portions are the same, exposing preferably includes exposing at least the second color (i.e., photosensitive region) to a predetermined dose of light such that the calibration color measurement value(s) and the verification color measurement value(s) are different.

In another embodiment, the method includes: (1) providing a color standard having a surface with at least two different colors arranged for a simultaneous color measurement; (2) calibrating the instrument; and (3) verifying that the color standard used in calibration is an authorized color standard of the predetermined specification and that the calibration of the color measuring instrument has achieved predetermined specified results.

The color measuring instrument for use with this method includes: (1) means for calibrating with the color standard; and (2) means for verifying that the color standard used in calibration is an authorized color standard of the predetermined specification and that the calibration of the color measurement instrument has achieved predetermined specified results.

According to another aspect of this invention, another method includes: (1) providing a color standard having a surface with at least a first region and a second region, wherein the first region has a first color characterized by a first predetermined coloration having premeasured color measurement value(s), and wherein the second region is photosensitive; (2) calibrating the instrument with the apparatus; (3) exposing at least the second region to light; and (4) verifying that the color standard used in calibration is an authorized color standard of the predetermined specification and that the calibration of the color measurement instrument has achieved predetermined specified results.

The color measuring instrument for use with this method includes: (1) means for calibrating; (2) means for exposing at least the second region to light; and (3) means for verifying that the color standard used in calibration is an authorized color standard of the predetermined specification and that the calibration of the color measurement instrument has achieved predetermined specified results.

Either of the above methods can include the following steps:
(1) providing a color standard having a surface with at least two different colors, a first of the colors being characterized by a first predetermined coloration having premeasured color measurement value(s) and a second of the colors being characterized by a second predetermined coloration having premeasured color measurement value(s);
(2) calibrating the instrument, the calibrating comprising:
measuring at least a first known and predetermined portion of the color standard surface to obtain preliminary calibration color measurement value(s), adjusting the instrument output to correspond to previously established calibrations, using the portion of the color standard and remeasuring the portion of the color standard to obtain calibration color measurement value(s) and
comparing the calibration color measurement value(s) with a calibration's premeasured color measurement value(s) for the same known and predetermined portion of the color standard surface to ensure that the calibration color measurement value(s) and the calibration's premeasured color measurement value(s) is substantially the same and therefore to ensure that calibration has achieved predetermined specified results; and
(3) verifying that the color standard used in calibration is an authorized color standard of the predetermined specification and that the calibration of the color measurement instrument has achieved predetermined specified results, the verifying comprising:
measuring at least a second known and predetermined portion of the color standard surface to obtain verification color measurement value(s), and
determining that the verification color measurement value(s) is substantially equal to a verification's premeasured color measurement value(s) for the same known and predetermined portion of the color standard surface.

With a color standard having at least two different colors arranged for simultaneous color measurement to sequentially calibrate a color measuring instrument with first predetermined color measurement value(s) of the color standard and verify the calibration with a second and different predetermined color measurement value(s) of the color standard, the color calibration and verification apparatus includes variance means to provide such first and second different color measurement values, the variance means being selected from the group consisting of (1) sequential inclusion and exclusion of at least the predetermined color measurement value(s) of a portion of said colors, (2) sequential exclusion and inclusion of at least the predetermined color measurement value(s) of a portion of said colors, and (3) sequential unexposure and exposure of photosensitive paper or material which provides at least one of said colors or portion of at least one of said colors.

FIG. 1 shows a simplified illustrative embodiment of color measuring instrument 10 and calibration and verification apparatus 20 in accordance with this invention. Instrument 10 can be a color measuring instrument such as a calorimeter or a spectrophotometer or other color measuring instrument suitable for measuring the color of a sample surface 30, such as hair, teeth, matter, materials, or human skin. Sensor head 15 is usually at one end of instrument 10. In order to ensure that measurements of such samples are accurate, such measurements are usually preceded by calibration and optionally verification. Calibration is usually performed by measuring a single color standard with known premeasured color measurement value(s) and comparing the measurement value(s) with the premeasured known value(s) to see that they are substantially the same. Once calibrated, the instrument is normally prepared to perform accurate color measurements producing color measurement value(s) that characterize the color of an unknown sample. However, when the calibration of the color measuring instrument is not performed correctly, such as when the color standard used during calibration was inaccurate for the intended calibration results, a subsequent color measurement of a sample with unknown color will be inaccurate. Thus, subsequent verification against a color standard different than that of the color standard used to calibrate can further ensure that the standard used to calibrate the machine was an accurate and authorized color standard for its intended calibration.

In accordance with one aspect of this invention, a method of color calibration and verification includes: (1) providing a color standard having a surface with at least two different colors, (2) calibrating a color measuring instrument by measuring one known portion of the color standard surface, including adjusting the instrument output to correspond to previously established calibration, using the color standard and remeasuring the color standard used in calibration to ensure the calibration achieved predetermined specified results and (3) verifying by measuring another known portion of the color standard surface to verify that the color standard used to calibrate is an authorized color standard having predetermined specifications and that the calibration of the color instrument has achieved predetermined specified results.

A color standard according to this aspect of the invention has a surface with at least two different colors. A first color is characterized by a first predetermined coloration having premeasured color measurement value(s). A second color can be characterized by a second predetermined coloration having premeasured color measurement value(s). The color standard is preferably substantially opaque, or has a back surface that is substantially opaque, with at least two colors that are arranged for a simultaneous color measurement.

As used herein, a color measurement value is any coordinate in any predefined color space. Examples of color spaces include, for example, XYZ Tristimulus value space (CIE 1931), $X_{10}Y_{10}Z_{10}$ Tristimulus value space (CIE 1964), Yxy Chromacity coordinate space, L*a*b* space (CIELAB), L*C*h space, Munsell space, Hunter Lab space, L*u*v* space (CIELUV), as well as a series of wavelengths, which can be measured in nanometers. Color measurement value(s) can include one or more color measurement values. Premeasured color measurement value(s) consist of color measurement value(s) that were obtained by measuring the color of a known portion of a color standard surface of specified predetermined coloration with a first calibrated color measuring instrument prior to using such color standard to calibrate a second color measuring instrument for easuring the color of samples.

A predetermined coloration's calibration's premeasured color measurement value(s) can be: (1) the first predetermined coloration's premeasured color measurement value(s), (2) the second predetermined coloration's premeasured color measurement value(s), or (3) any combination of the first and the second predetermined coloration's premeasured color measurement value(s). A predetermined coloration's calibration's premeasured color measurement value(s) can consist of color measurement value(s) that were obtained by measuring the color of a first known portion of a color standard surface of specified predetermined coloration with the first calibrated color measuring instrument prior to using the color standard to calibrate the second color measuring instrument for measuring the color of samples.

A predetermined coloration's verification's premeasured color measurement value(s) can be: (1) the first predetermined coloration's premeasured color measurement value(s), (2) the second predetermined coloration's premeasured color measurement value(s), or (3) any combination of the first and the second predetermined coloration's premeasured color measurement value(s). A predetermined coloration's verification's premeasured color measurement value(s) can consist of color measurement value(s) that were obtained by measuring the color of a second known portion of a color standard surface of specified predetermined coloration with the first calibrated color measuring instrument prior to using the color standard to calibrate the second color measuring instrument for measuring the color of samples.

After a color standard of specified predetermined coloration is provided in the first step, the color measuring instrument is preferably calibrated according to the principles of this invention.

As used herein, the term "calibration" includes both conventional calibration and standardization techniques as defined by *Standard Terminology of Appearance* (ASTM definitions). Conventional color calibration is the finding and elimination of systematic errors of a color measuring instrument scale or method of measurement by use of material standards and techniques traceable to an authorized national or international measurement system. Standardization is the process of adjusting the instrument output to correspond to a previously established calibration using one or more specimens or reference materials.

According to this invention, calibration includes (1) providing a color standard of predetermined specified coloration, (2) measuring at least a first known and predetermined portion of the color standard surface to obtain preliminary calibration color measurement value(s), adjusting the instrument output to correspond to previously established calibration, using the color standard and remeasuring the color standard to obtain calibration color measurement value(s), and (3) comparing the calibration color measurement value(s) (or calculated color measurement value(s) of a different color index, which are calculated from the color measurement value(s)) with calibration's premeasured color measurement value(s) for the same known and predetermined portion of the color standard surface to ensure that the calibration color measurement value(s) and the calibration's premeasured color measurement value(s) are substantially the same and therefore to ensure that calibration has achieved predetermined specified results.

After the color measuring instrument is calibrated using a first known portion of the color standard surface, a second known portion of the color standard surface is used to verify that the color standard used in the calibration is an authorized color standard of predetermined specification and that the calibration of the color measuring instrument has achieved predetermined specified results.

According to this invention, verifying includes (1) measuring at least a second known and predetermined portion of the color standard surface to obtain verification color measurement value(s), and (2) determining that the verification color measurement value(s) (or calculated verification color measurement value(s) of a different color index, which are calculated from the verification color measurement value(s)) is substantially equal to the verification's premeasured color measurement value(s) for the same know and predetermined portion of the color standard surface. When the verification color measurement value(s) is substantially equal to a verification's premeasured color measurement value(s), it can be determined that the calibration achieved the predetermined specified results and that the color standard used for calibration and for verification was (a) the predetermined color standard specified for calibration and verification and (b) authorized.

The first and second colors of predetermined coloration on the color standard surface can be disposed on that surface in a known ratio of surface areas. As used herein, a "known ratio of surface areas" is any ratio of surface areas such that a measurement of a known portion of that surface corresponds to a known and predetermined coloration having premeasured color measurement value(s). This means that the ratio of a first surface area on which the first color of predetermined coloration is disposed to a second surface area on which the second color of predetermined coloration is disposed is predetermined and known. That known ratio can be uniform over the standard surface or it can vary over the surface, such as radially, in a known fashion.

Alternatively, the two colors of predetermined coloration can be disposed on the color standard surface in a known configuration. As used herein, a "known configuration" is any arrangement of colors such that a measurement of a known portion of the color standard surface corresponds to a known and predetermined coloration having premeasured color measurement value(s).

A known ratio or configuration permits a variety of calibration and verification methods according to this invention.

Figure 2B:
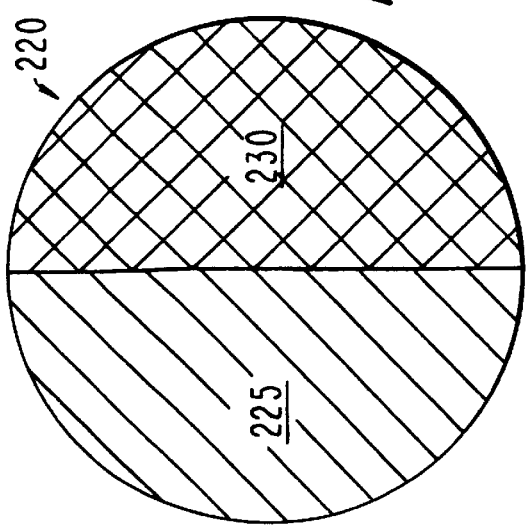
FIGS. 2A–2D are planar views of various illustrative embodiments of color standards, in accordance with this invention.
Figure 2D:
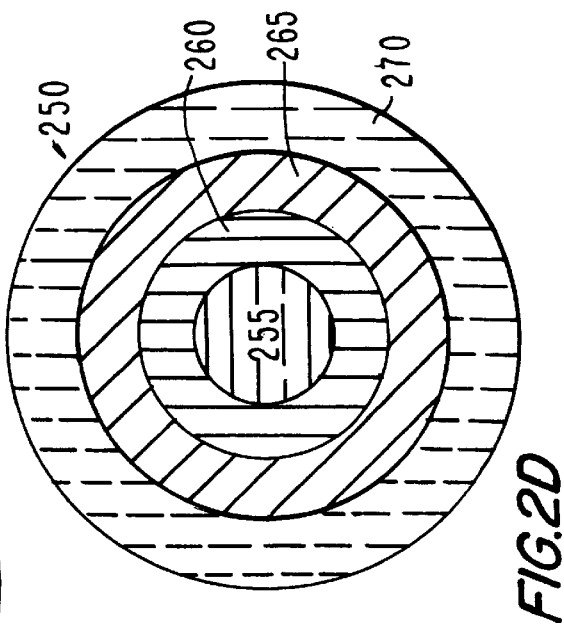
Figure 2A:
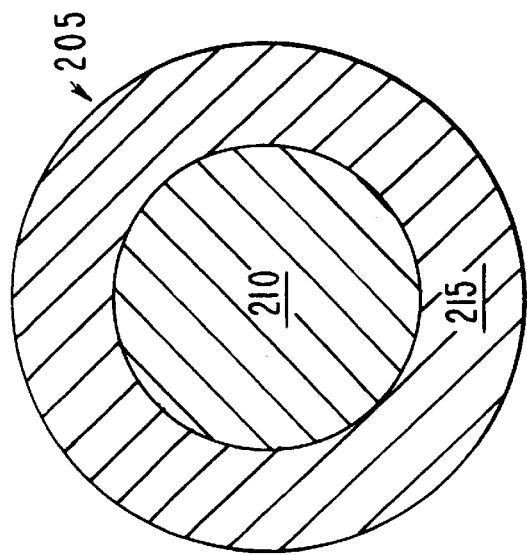
Figure 2C:
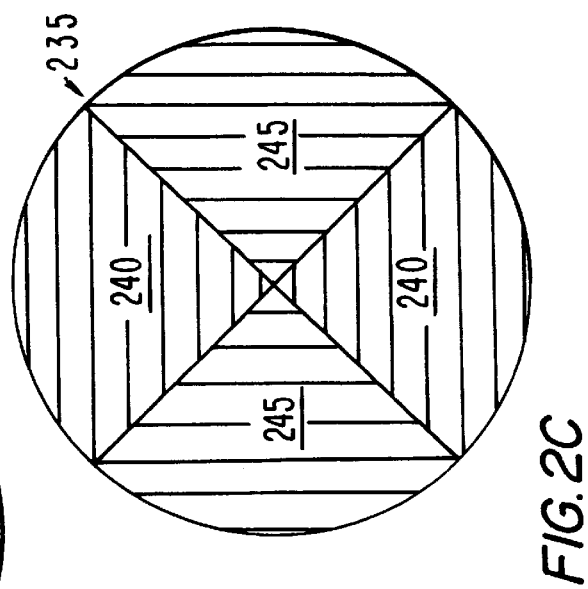

FIGS. 2A–2D show four embodiments of a color standard with at least two different colors of predetermined coloration according to this invention. FIG. 2A shows color standard surface 205 having a first color of predetermined coloration disposed on central portion 210 of surface 205 and a second color of predetermined coloration disposed on outer portion 215, which is disposed radially outside central portion 210. Preferably, portions 210 and 215 are disposed in a radially symmetric fashion, as shown in FIG. 2A. FIG. 2B shows color standard surface 220 having a first color of predetermined coloration disposed on semi-circular portion 225 of surface 220 and a second color of predetermined coloration disposed on adjacent semi-circular portion 230 of surface 220. FIG. 2C shows color standard surface 235 having a first color of predetermined coloration disposed on slices 240 and a second color of predetermined coloration disposed on slices 245 of surface 235.

A color standard in accordance with this invention can have three or more colors of predetermined coloration, as shown in FIG. 2D. Color standard 250 of FIG. 2D has a first color of predetermined coloration disposed on a central portion 255, a second color of predetermined coloration disposed on portion 260 that is radially outside portion 255, a third color of predetermined coloration disposed on portion 265 that is radially outside portion 260, and portion 270 that is radially outside portion 265. Although color standard 250 shows four different colors of predetermined coloration, a person of ordinary skill in the art would understand that any number of colors of predetermined coloration can be disposed on surface 250 in accordance with this invention. Also, the colors of predetermined coloration can be disposed on the surface of a color standard in a substantially random fashion, as long as within that random disposition of colors of predetermined coloration each color or gradation of color has a predetermined coloration of premeasured color measurement value(s) for subsequent use in calibration and verification.

A common feature of the color standards shown in FIGS. 2A–2D is that they all have predetermined and known color configurations so that a measurement of a known portion of that surface will correspond to known color of predetermined coloration having premeasured color measurement value(s).

According to one aspect of the invention, the two different colors on the color standard can differ only by a single premeasured color measurement value, such as when the predetermined coloration's premeasured color measurement value(s) are measured in CIE Hunter Lab space (1948) and only the lightness color measurement value L is different. In this case, and according to this invention, the two colors would be considered to have different premeasured color measurement value(s), as long as the value of L differed, preferably by at least 3 points.

One method of achieving a very high L value is by providing a high gloss finish to a region of the color standard. In fact, when the high gloss finish is applied to a region of the color standard, the L value that corresponds to that region can be extremely large (greater than 80 or 90 points). However, such high gloss finishes also tend to strongly affect (usually increase) the value of the other premeasured color measurement value(s), that is the a and b values.

Therefore, in order to make a color measurement of a portion of a color standard having a high L value and relatively unaffected (or low) a and b values, that portion, which can be measured during calibration and/or verification, must include a region having at least one color with a large L value (e.g., a value greater than about 80 points, and preferably greater than about 90 points) and a second color with a relatively small L value and substantially unaffected (e.g., low) a and b values.

Thus, in accordance with one aspect of the present invention, calibration and verification can be performed according to this invention by using a color standard with two different colors, a first of which has a high gloss finish and a second of which has a matte, a low gloss (or no gloss) finish. In an unauthorized color standard on which the high gloss finish was provided over the whole known portion, the a and b values would necessarily be large. Thus, if a color measuring instrument was programmed to only calibrate and verify with a high L value and low a and b values, non-authorized color standards could be detected and rejected according to this invention. It should be clear, however, that while this aspect of the invention is described in terms of CIE Hunter Lab space (1948), any color coordinates of any color index can be used to describe the colorization of a color standard in accordance with this invention.

Calibration according to this invention can be performed by measuring any known and predetermined portion of the color standard surface. Therefore, a calibration measurement can include measuring a known and predetermined portion of the standard surface on which a single color of predetermined coloration is disposed, two colors of predetermined coloration are disposed, or three or more colors of predetermined coloration are disposed, as long as that portion corresponds to a known color of predetermined coloration having premeasured color measurement value(s).

Figure 3:
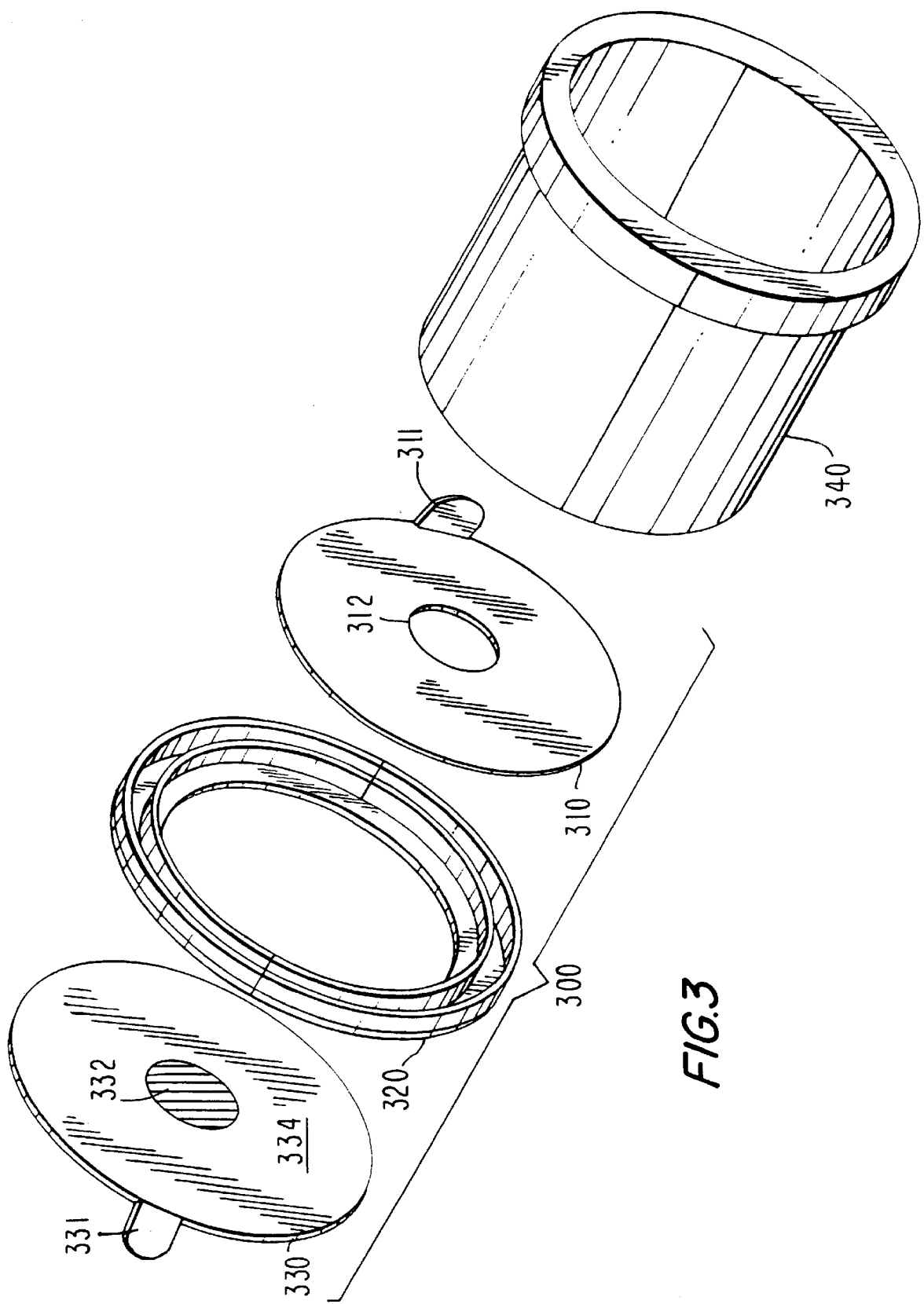
FIG. 3 is an exploded perspective view of an illustrative embodiment of a calibration and verification apparatus, in accordance with this invention.

In accordance with this invention, calibration can be performed using a color calibration and verification apparatus. FIG. 3 shows an illustrative embodiment of color calibration and verification apparatus 300. Apparatus 300 includes mask 310, frame 320, and color standard 330. Color standard 330 is removably fastened to frame 320. Color standard 330 can have tab portion 331 for a user to grasp when removal of color standard 330 is desired. Mask 310 is mounted, preferably removably mounted, between color measuring instrument sensor head 340 and color standard 330. Mask 310 can also have tab portion 311 for a user to grasp when removal of mask 310 is desired. Also, frame 320 can itself act as a mask to some degree.

During calibration with apparatus 300, calibration color measurement value(s) can be obtained by measuring a first known portion of color standard 330. In FIG. 3, the first color of predetermined coloration is disposed centrally on standard 330 and the second color of predetermined coloration is disposed on an annular region radially outside the central region of standard 330. The shape, size, and position of aperture 312 of mask 310 determines the first known portion measured during calibration. That portion can include all of the first color of predetermined coloration, part of the first color of predetermined coloration, or none of the first color of predetermined coloration. As shown in FIG. 3, however, mask 310 blocks the outer annular region so that first known portion 332 of standard 330 is measured alone. When aperture 312 is made larger, the first known portion includes all of the central region characterized by the first color of predetermined coloration and part of the annular region characterized by the second color of predetermined coloration. When aperture 312 is made smaller than the central region (i.e., surface area on which the first color is disposed), only a part of the central region is measured and none of the annular region is measured. Therefore, the regions that are characterized by different colors can be arranged so that they can be simultaneously measured. However, such an arrangement does not mean that every color measurement includes two or more different colors.

After calibration is performed using calibration and verification apparatus 300 shown in FIG. 3, the calibration and the color standard can be verified after removing mask 310. Mask 310 can be removed from apparatus 300 by any convenient method, including grasping and then pulling tab portion 311 of mask 310 until mask 310 no longer blocks light from entering the color measuring instrument. Alternatively, mask 310 could be removed by (1) unfastening apparatus 300 from color measuring instrument head 340 to expose mask 310, (2) pulling tab portion 311 of mask 310 until mask 310 is removed from apparatus 300, and (3) replacing apparatus 300 on color measuring instrument head 340.

After mask 310 is removed, the second known portion of color standard 330 includes substantially the entire color standard surface, including all of first known portion 332. In particular, second known portion 334 would include a surface on which the first and second colors of predetermined coloration are disposed.

Second known portion 334, which is used during verification, can be any portion of the standard surface, such as a portion that includes first known portion 332. Like calibration, verification can be performed by measuring any known portion of the color standard surface. As described more fully below, first known portion 332 and second known portion 334 can correspond to the same surface area, such as when at least one of the two colors are photosensitive. Therefore, a verification measurement (or alternatively a calibration measurement) can include measuring a known and predetermined portion of the standard surface on which a single color of predetermined coloration is disposed, two colors of predetermined coloration are disposed, or three or more colors of predetermined coloration are disposed, as long as that known portion corresponds to known color of predetermined coloration having premeasured color measurement value(s). When two or more colors are used, they are preferably arranged for one or more simultaneous color measurements. After calibration is performed using calibration and verification apparatus 300 shown in FIG. 3, the calibration and the color standard may be verified after removing mask 310. Then, the second known portion of color standard 330 would include substantially the entire color standard surface including first known portion 332 and would be a -portion of the color standard surface on which the first color of predetermined coloration and the second color of predetermined coloration are disposed.

Figure 4A:
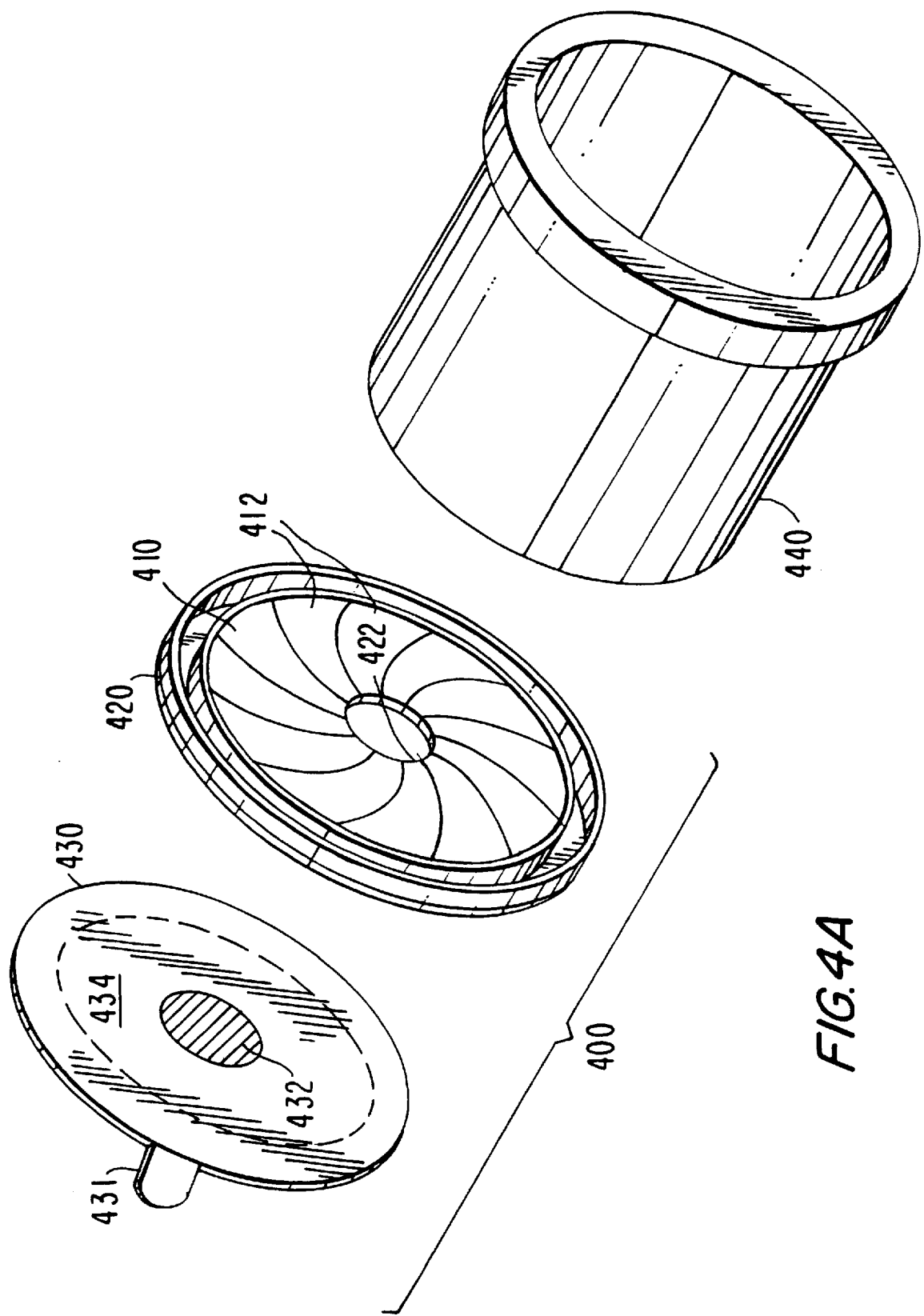
FIG. 4A is an exploded-perspective view of another illustrative embodiment of a calibration and verification apparatus, including a variable aperture mask, frame, and color standard, in accordance with this invention.
Figure 4C:
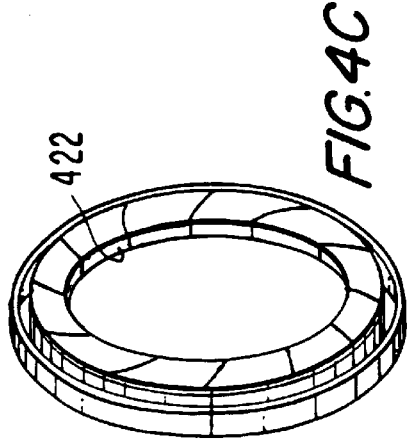
FIG. 4C is a perspective view of the variable aperture mask and frame shown in FIG. 4A in an "open" position, in accordance with this invention.
Figure 4B:
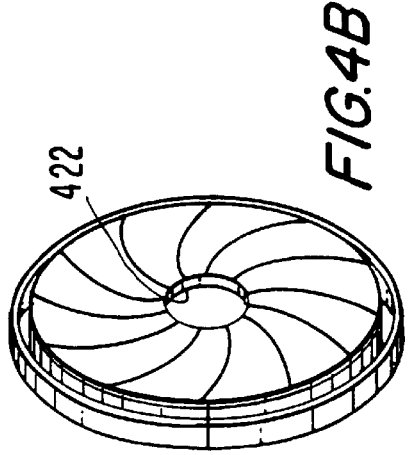
FIG. 4B is a perspective view of the variable aperture mask and frame shown in FIG. 4A in a "closed" position, in accordance with this invention.

According to another embodiment of this invention, the aperture of a mask can have a variable size. For example, as shown in FIGS. 4A–4C, calibration and verification apparatus 400 includes mask 410, frame 420, and color standard 430. Color standard 430 (shown in FIG. 4A) is similar to color standard 205, shown in FIG. 2A. Color standard 430 is preferably fastened to frame 420 so that its calibration and verification surface faces color measuring instrument sensor head 440. Color standard 430 can have tab portion 431 for a user to grasp when color standard removal is desired. Mask 410 is mounted between head 440 and color standard 430 and can include a plurality of opaque elements 412 that can move relative to each other to change the diameter of central aperture 422 in order to mask a variable portion of color standard 430 (mask 410 is sometimes referred to as an iris). Mask 410 preferably has at least two operable positions determined by the relative positions of opaque elements 412, but can have more depending on the number of individual calibration and verification measurements desired.

FIG. 4B shows frame 420 and mask 410 in a first operable position where mask 410 masks a radially outer part of the color standard surface. In that position, only first known portion 432 is measurable. FIG. 4C shows mask 410 in a second operable position, in which case only a small outer part of the color standard surface is masked. In that case, second known portion 434 is a portion that includes first portion 432 plus a part of the previously masked surface (an adjacent portion radially outside first known portion 432). When mask 410 is in a predetermined intermediate position (not shown) between the first and second operable positions, a predetermined combination of colors of predetermined coloration is measurable. Of course, the color configuration of the color standard can be any known configuration and need not be the particular standard shown in FIG. 4A.

Figure 5C:
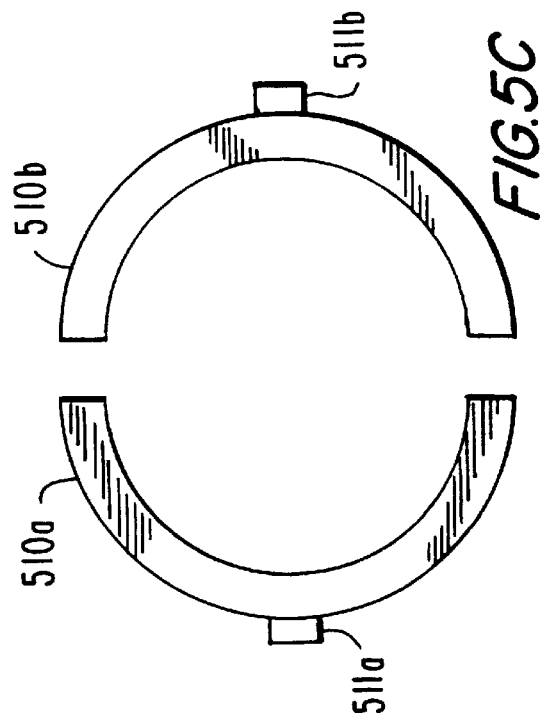
FIG. 5C is a perspective view of the variable aperture mask and frame shown in FIG. 5A in an "open" position, in accordance with this invention.
Figure 5B:
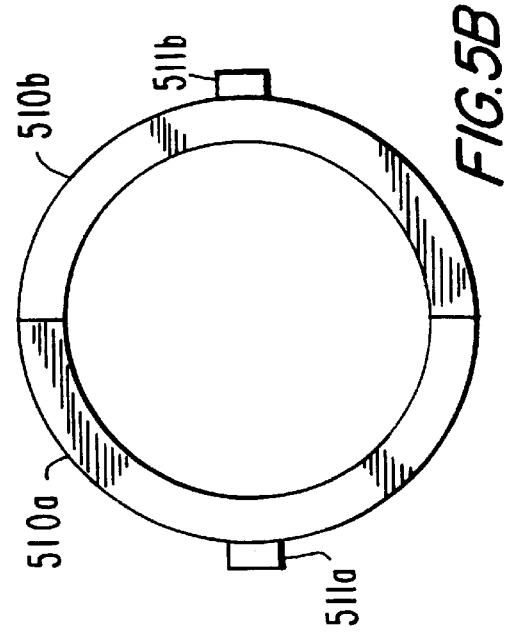
FIG. 5B is a perspective view of the variable aperture mask and frame shown in FIG. 5A in a "closed" position, in accordance with this invention.
Figure 5A:
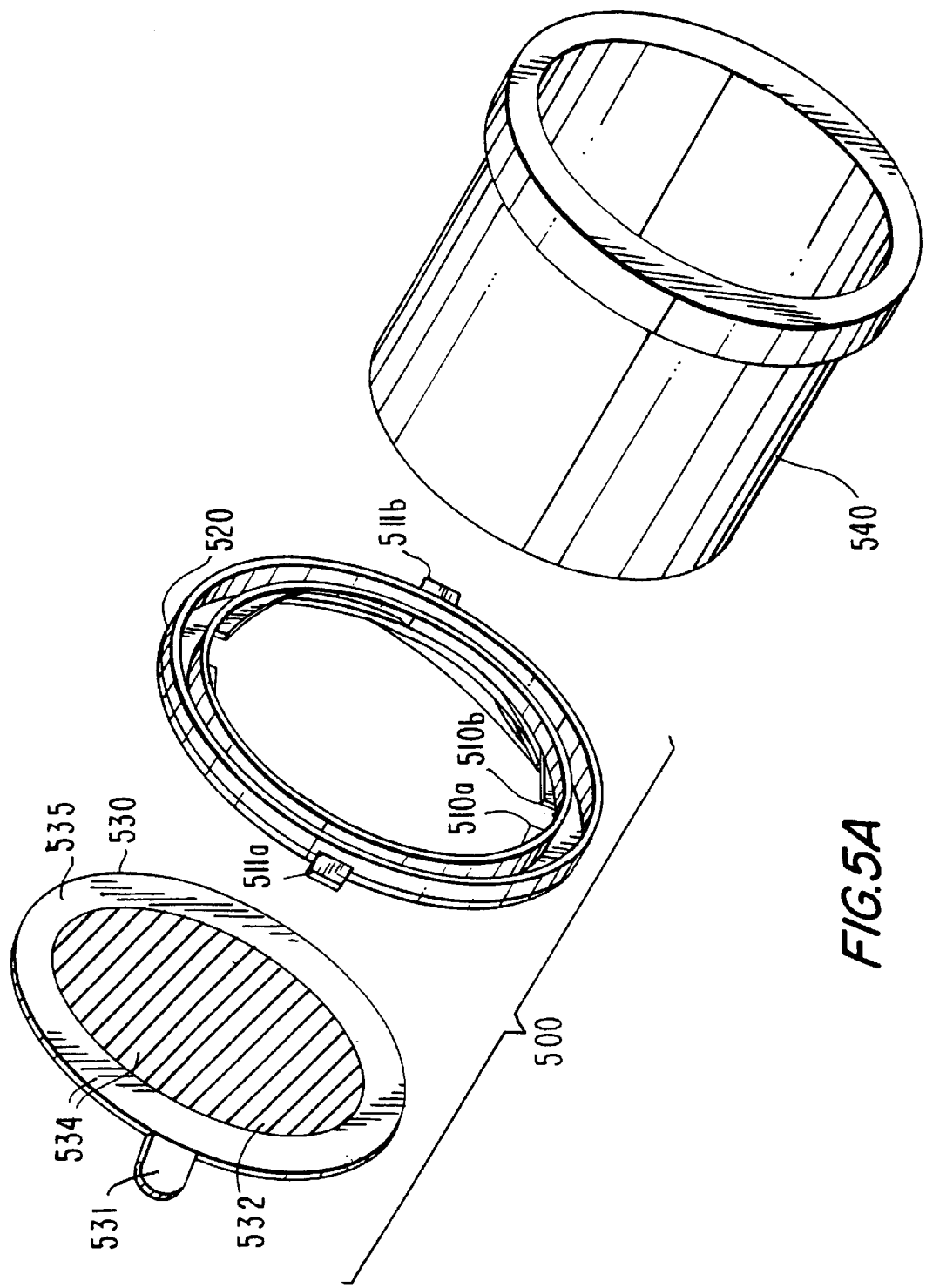
FIG. 5A is an exploded perspective view of yet another illustrative embodiment of a calibration and verification apparatus, including another variable aperture mask, frame, and color standard, in accordance with this invention.

FIGS. 5A–5C show another calibration and verification instrument 500, which includes mask 510 (including mask elements 510a and 510b), frame 520, and color standard 530. Color standard 530 shown in FIG. 5 is again similar to color standard 220 shown in FIG. 2B, however that color standard can have any known color configuration of predetermined coloration in accordance with this invention. Color standard 530 is fastened to frame 520 so that the color standard surface faces color measuring instrument sensor head 540. Color standard 530 can have tab portion 531 for a user to grasp when it is desired to remove standard 530 from frame 520 to measure a sample of color. Mask elements 510a and 510b can be mounted in annular frame 520 and between head 540 and color standard 530. Preferably, elements 510a and 510b are slidable relative to frame 520 for masking a desired portion of the surface of standard 530.

Mask elements 510a and 510b can also have respective tabs 511a and 511b so that a user can slide each of the mask elements into at least two operable positions (including a completely removed position), but can have more than two positions depending on the number of individual calibration and verification measurements desired. For example, FIGS. 5B and 5C show mask elements in "closed" and "open" operable positions, respectively. In the closed position, semi-circular mask elements form a circle and substantially block outer annular region 535 of the standard, thereby masking first known portion 532 measurable. When mask 510 is in the open position (shown in FIG. 5C) second known portion 534, which includes first known portion 532 and at least some of the previously blocked outer annular region 535 of color standard 530, is measurable. As described above, mask 510 can be used in a predetermined intermediate position between the first and second operable positions so that a predetermined combination of colors of predetermined coloration on the color standard surface is measurable.

Figure 6A:
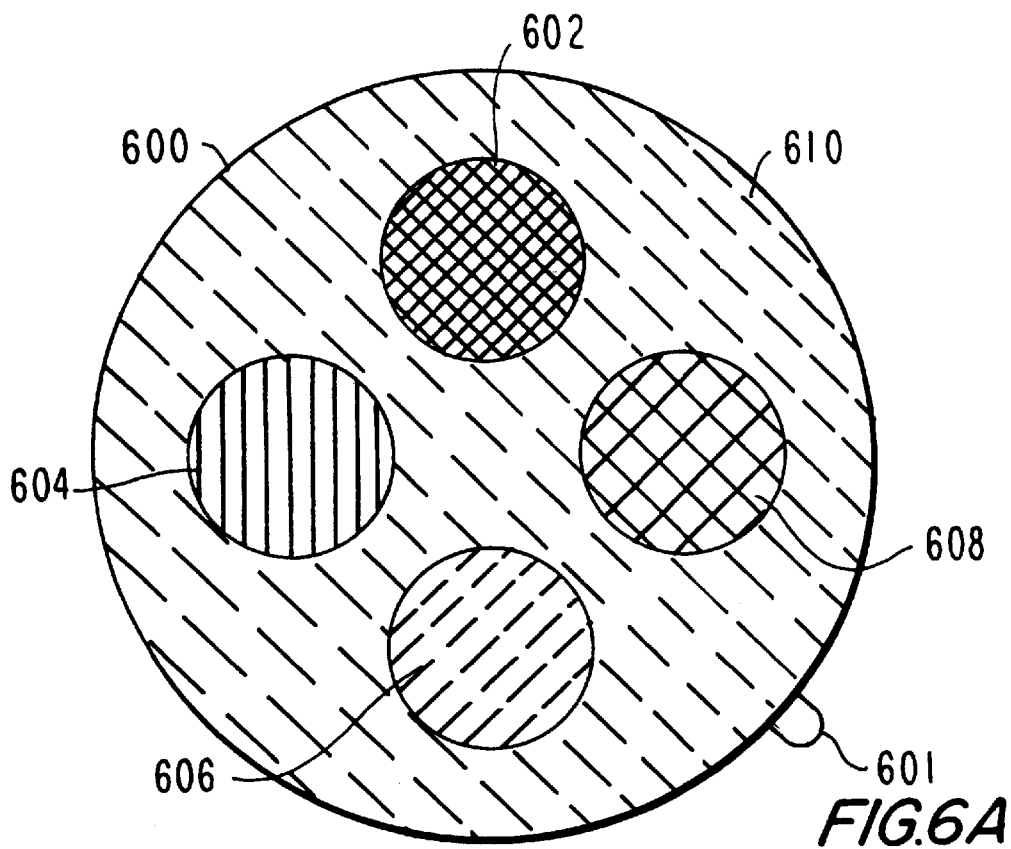
FIG. 6A is a planar view of still another illustrative embodiment of a color standard, in accordance with this invention.

In another embodiment according to this invention, a color standard can have a plurality of portions that can be measured during calibration and/or verification. When used to calibrate, the measurable portion on the color standard surface is referred to as a first known portion. When used to verify, the measurable portion is referred to as a second known portion. FIG. 6A shows color standard 600, which includes five regions 602, 604, 606, 608, and 610 with different colors disposed thereon. A first known portion, then, can be any of these five regions or, depending on the mask used and its relative position, a predetermined combination of these regions. Similarly, a second known portion can be any of the regions or a predetermined combination of these regions. Any of the five regions can be photosensitive, as described more fully below.

Figure 6B:
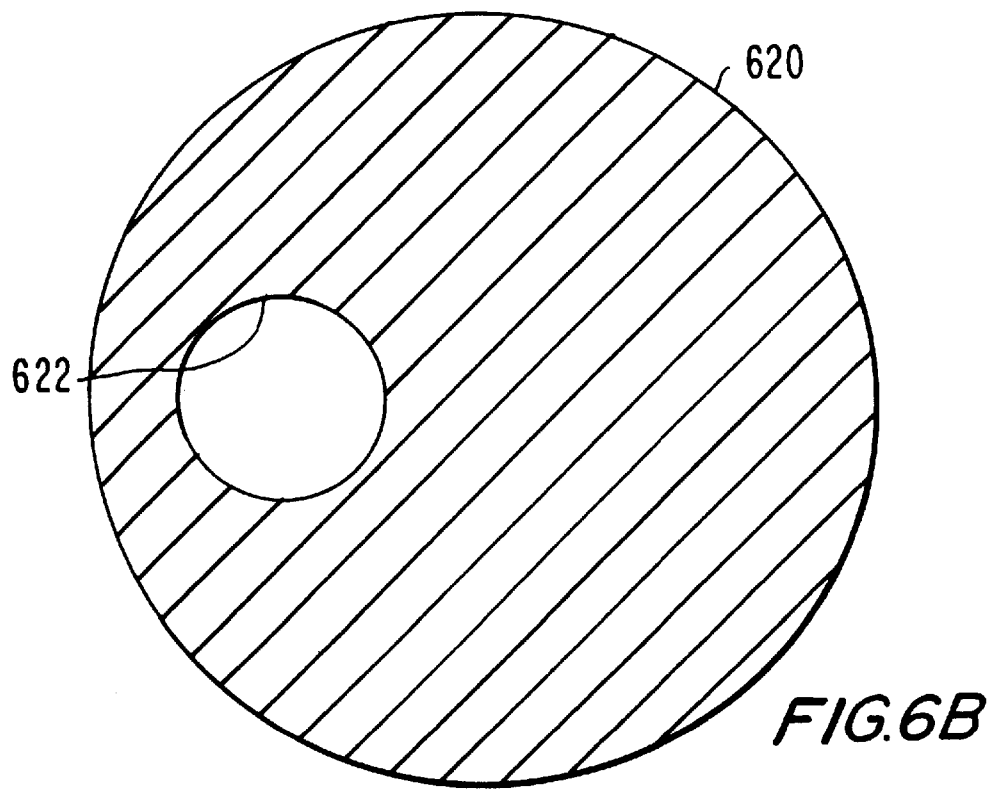
FIG. 6B is a planar view of a mask that can be used with the color standard shown in FIG. 6A in accordance with this invention.

FIG. 6B shows an illustrative embodiment of a mask that can be used in combination with color standard 600 is mask 620. Mask 620 is preferably substantially flat and has aperture 622. Mask 620 can be constructed with any material that is opaque to visible wavelengths of light, and is preferably black.

A first known portion, or calibration portion, of standard 600 can be selected by adjusting the relative position between color standard 600 and mask 620. Adjusting the relative position can involve rotating color standard 600 or mask 620 while the other is fixed.

For example, FIGS. 6C and 6D show calibration and verification apparatus 630 in which color standard 600 is rotatable and mask 620 is fixed. Apparatus 630 can therefore include color standard 600, mask 620, and frame 632. Frame 632 is mountable to sensor head 640 of a color measuring instrument (not shown) and color standard 600 is fastened to movable frame element 633 such that the surface of color standard 600 faces a light detector, or sensor, in instrument head 640. The desired position of standard 600 can be selected by rotating frame element 633, such as by moving handle 634, which is fixed to movable element 633. In addition to rotating color standard in order to define different known portions of color standard 600 for measurement, mask 620 can be removed entirely from apparatus 630, in which case the known portion would include substantially the entire surface of color standard 600. Mask 620 can be removed by grasping and pulling a tab portion (not shown) of mask 620 and can be performed while apparatus 630 is temporarily removed from instrument head 640.

After calibration and verification, standard 600 should be completely removed from movable element 633 by peeling standard 600 away from element 633 by grasping and pulling tab portion 601. Standard 600 can be fastened to frame 633 with adhesive so that standard 600 is destroyed when standard 600 is removed from frame element 633, thereby ensuring that an unexposed standard will be used for any subsequent calibration or verification. After color standard 600 is removed from frame 633, frame 633 remains mounted to head 640 of the color measuring instrument so that color measuring instrument is ready for measuring a sample with unknown coloration, such as human skin.

When standard 600 is removed, a sanitary surface (rim 635) of frame 632 is preferably exposed. That sanitary surface of rim 635 can then be placed directly on the unknown surface (e.g., human skin) during a subsequent color measurement. This sanitary feature is especially useful in the medical field where a sanitary surface reduces the possibility of transmitting germs from one patient to another. Mask 620 is preferably removed before measuring the color of a sample of unknown coloration so that a large surface area is available for the subsequent measurement.

In an alternative embodiment, FIGS. 6E and 6F show calibration and verification apparatus 650 in which color standard 600 is fixed and mask 620 is rotatable. Apparatus 650 can therefore include color standard 600, mask 620, and frame 652. Frame 652 is mountable to a sensor head 640 of a color measuring instrument (not shown) and color standard 600 is fastened to fixed frame element 653 such that the surface of color standard 600 faces a light detector, or sensor, in instrument head 640. In contrast to apparatus 630, the position of mask 620 in apparatus 650 can be selected by rotation of mask 620, such as by moving mask handle 654, which is fixed to element 653. Regardless of the particular apparatus used, it should be clear to a person of ordinary skill in the art that multiple portions can be selected on color standard 600 for calibration and verification in accordance with this invention.

After calibration and verification and in accordance with the sanitary aspect of this invention, standard 600 should be removed from movable element 633 by peeling standard 600 away from element 633 by grasping and pulling tab portion 601. When standard 600 is removed, a sanitary surface (rim 655) of frame 652 is preferably exposed. Preferably, mask 620 should also be removed before measuring the colorization of a sample of unknown colorization in order to maximize the measurable surface area of the sample.

Figure 7A:
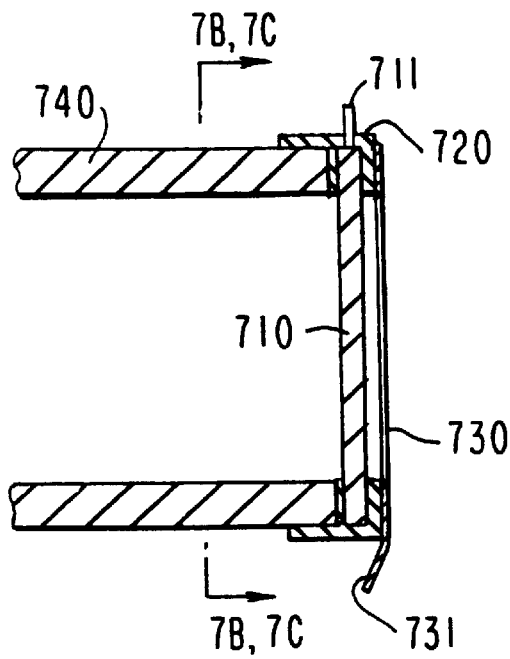
FIG. 7A is a side cross-sectional view of yet another illustrative embodiment of a calibration and verification apparatus that can be used in accordance with this invention.

According to another embodiment of this invention, FIG. 7 shows calibration and verification apparatus 700. Instrument 700 includes mask 710, frame 720, and color standard 730. Color standard 730 is similar to color standard 220 shown in FIG. 2B, except that standard 730 is substantially square. Any of the colors disposed on color standard 730 can be photosensitive, as described more fully below. Color standard 730 is fastened to frame 720 so that its calibration and verification surface face color measuring instrument sensor head 740. Color standard 730 can have tab portion 731 for a user to grasp when standard removal is desired.

Mask 710 can be slidably mounted between head 740 and color standard 730. Accordingly, mask 711 can also have handle portion 711 to (1) facilitate changing the position of mask 710 between calibration and verification and/or (2) to remove mask 711 from frame 720 before measuring the color of an unknown sample. Alternatively, handle portion 712 of mask 710 can also be used to remove mask 710 from frame 720.

Figure 7B:
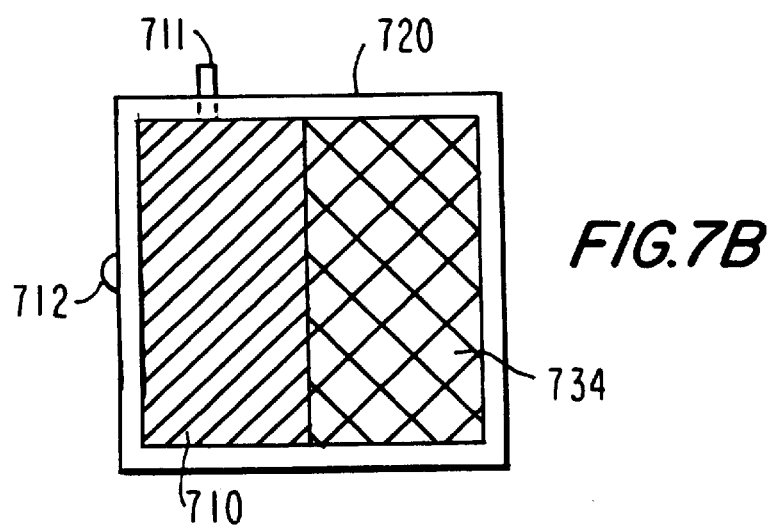
FIG. 7B is a cross-sectional view of the calibration and verification apparatus taken from line 7B—7B of FIG. 7A with a mask in a first operable position, in accordance with this invention.
Figure 7C:
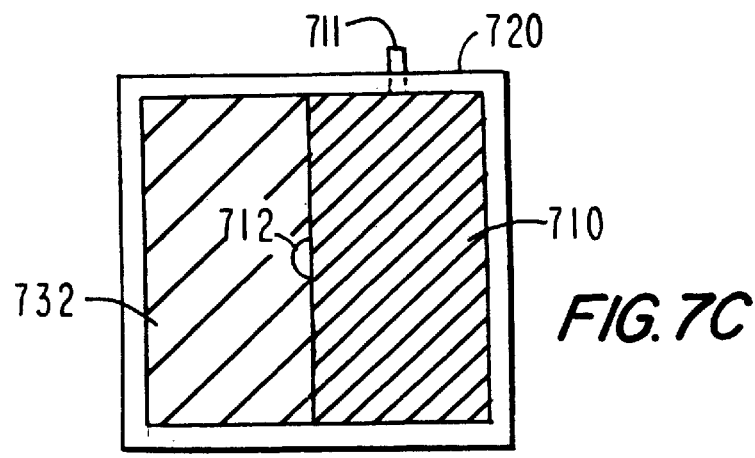
FIG. 7C is a cross-sectional view of the calibration and verification apparatus taken from line 7C—7C of FIG. 7A with a mask in a second operable position, in accordance with this invention.

FIG. 7B shows mask 710 in a first operable position where mask 710 masks first known portion 732 and second known portion 734 is measurable. When mask 710 is in a second operable position, as shown in FIG. 7C, second known portion 734 is masked and first known portion 732 is measurable. When mask 710 is in a predetermined intermediate position between the first and second operable positions, a predetermined combination of colors of predetermined coloration (e.g., colors on first and second portions 732 and 734) is measurable.

The physical masking techniques described above can be necessary when the first and second known portions of the color standard would otherwise simultaneously be exposed for a color measurement without a mask. When only one of the known portions is exposed for calibration without a mask, no mask may be necessary. However, in order to expose the other known portion of the color standard for verification, that color standard may be physically moved or reoriented between calibration and verification. One example of a color standard with two surfaces is a flat sheet having two opposite sides, each of which has a surface with a predetermined coloration having premeasured color measurement value(s). In this case the color standard must be flipped or exchanged, respectively, to expose the appropriate surfaces during calibration and verification. Alternatively, the two surfaces could be on physically distinct objects, in which case the object must be flipped or exchanged between calibration and verification. Regardless of whether a mask is used or not, the above-identified procedures for calibrating and verifying according to this invention still apply.

In contrast to the actual masking techniques used to calibrate and verify described above, the methods described below involve constructive masking techniques. "Actual" masking involves the physical blocking of light so that either the first known portion or the second known portion is at least partially defined by a physical mask. "Constructive" masking, however, is performed by a color measuring instrument without a physical mask and can be used when the first known portion and the second known portion include the same color or the same combination of colors—that is, the portions correspond to the same surface area of the color standard. Constructive masking is useful because the color calibration and verification apparatus used in accordance with this aspect of the invention is simple and inexpensive to manufacture.

FIG. 8 shows an illustrative embodiment of color calibration and verification apparatus 800 for use with constructive masking methods of this invention. Apparatus 800 includes frame 820 and color standard 830. Color standard 830 is removably fastened to frame 820. As already described above, color standard 830 can have tab portion 831 for easy removal from frame 820. Removal of color standard 830 can involve peeling color standard 830 away from frame 820 where they are attached, such as by pressure or adhesive. As in the case of physical masking procedures, constructive masking requires that the color standard be removed before a color measurement is made on an unknown sample.

When calibrating with apparatus 800, calibration color measurement value(s) are obtained by measuring a known portion of color standard 830. Color standard 830 is similar to standard 205 shown in FIG. 2A, but can be any color standard in accordance with this invention. For example, a color standard for use with this aspect of the invention can have a surface with at least two different colors in accordance with this invention—namely, a first color characterized by a first predetermined coloration having premeasured color measurement value(s) and a second color characterized by a second predetermined coloration having premeasured color measurement value(s). Another color standard that can be used in accordance with this invention is one having one or more regions having a high gloss finish or that is photosensitive.

As shown in FIG. 8, the first known portion measured during calibration can be substantially the entire color standard surface but can also be a predetermined portion of that surface when a mask is used. Of course, frame 820 can to some degree act as a mask itself. When two or more colors are disposed on a single surface, the colors are preferably arranged for one or more simultaneous color measurements, even though a color measurement of a single color alone can also be possible. This means that first known portion 832 and second known portion 834 can be arranged inside the window provided by frame 820.

According to this embodiment of the invention, standard 830 can be verified after calibration without changing the portion of the surface being measured. That is, the first known portion and the second known portion refer to the same surface area of color standard 830, which can include the same colors or the same predetermined combination of colors. Calibration is the same according to this aspect of the invention, but verification includes an extra step.

The extra step is necessary because in this constructive technique, the second known portion will have verification measurement value(s) that can be different from the verification's premeasured color measurement value(s). Therefore, in order to verify whether or not the color standard is an authorized standard of predetermined specification and to verify that the calibration of the color measuring instrument is according to a predetermined specification according to this aspect of the invention, computed color measurement values must be calculated based on the verification color measurement value(s) and those computed values are compared with the verification's premeasured color measurement value(s). The calculation is simple because the verification's premeasured color measurement value(s) would be related to the verification color measurement value(s) by predetermined differential color measurement value(s). The computed color measurement value(s) can be the sum of or difference between the verification color measurement value(s) and the predetermined differential color measurement value(s).

Therefore, the step of determining that the verification color measurement value(s) is substantially equal to the verification's premeasured color measurement value(s) can include (1) calculating computed color measurement value (s) based on the verification color measurement value(s) and (2) determining that the computed color measurement value (s) are substantially equal to the verification's premeasured color measurement value(s).

As in the case of the physical masking techniques described above, the known portion measured during the calibration and verification steps in this constructive masking technique can be any known portion on the standard surface, and can include a first color, a second color, or a predetermined combination of a first color and a second color. When standard 830 has additional colors disposed thereon, the known portion can include those additional colors as well.

As described above, the computed color measurement value(s) can be calculated based on the verification color measurement value(s). In one embodiment, the computed color measurement value(s) can be obtained by adding or subtracting predetermined differential color measurement value(s) to the verification color measurement value(s). For example, when the known portion measured during verification is a portion that consists essentially of the first color, the predetermined differential color measurement value(s) can be based on the verification's premeasured color measurement value(s). If the verification's predetermined coloration's premeasured color measurement value(s) correspond to a combination of the first and second colors, then the predetermined differential color measurement value(s) would simply correspond to the contribution of the second color, that is, the "difference" between the contribution of the first color and the contribution of the combination of the first and second colors.

In another embodiment according to this invention, the known portion measured during verification is a portion that consists essentially of the second color. In that case, the predetermined differential color measurement value(s)

would also be based on the verification's premeasured color measurement value(s). However, if the verification's premeasured color measurement value(s) correspond to a combination of the first and second colors, then the predetermined differential color measurement value(s) would simply correspond to the contribution of the first color, that is, the "difference" between the contribution of the second color and the contribution of the combination of the first and second colors.

In a preferred embodiment, the known portion measured in the verification step includes a predetermined combination of the first color and the second color. Then, if the verification's premeasured color measurement value(s) corresponds to a first color, the predetermined differential color measurement value(s) would simply correspond to the contribution of the second color—the "difference" between the contribution of the first color and the contribution of the predetermined combination of the first and second colors.

Figure 9:
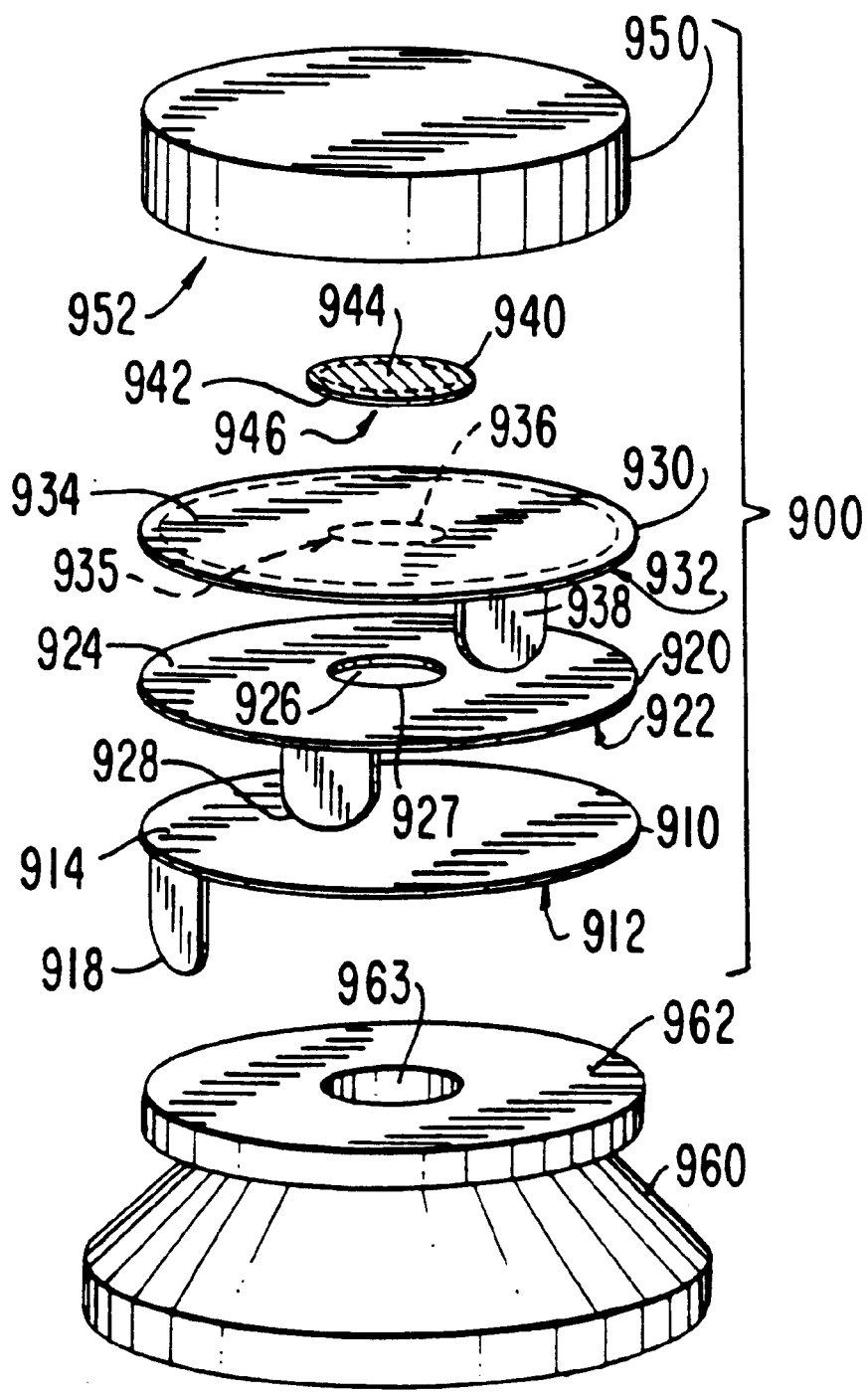
FIG. 9 is an exploded perspective view of yet another illustrative embodiment of a calibration and verification apparatus using a photosensitive layer in accordance with this invention.
Figure 10:
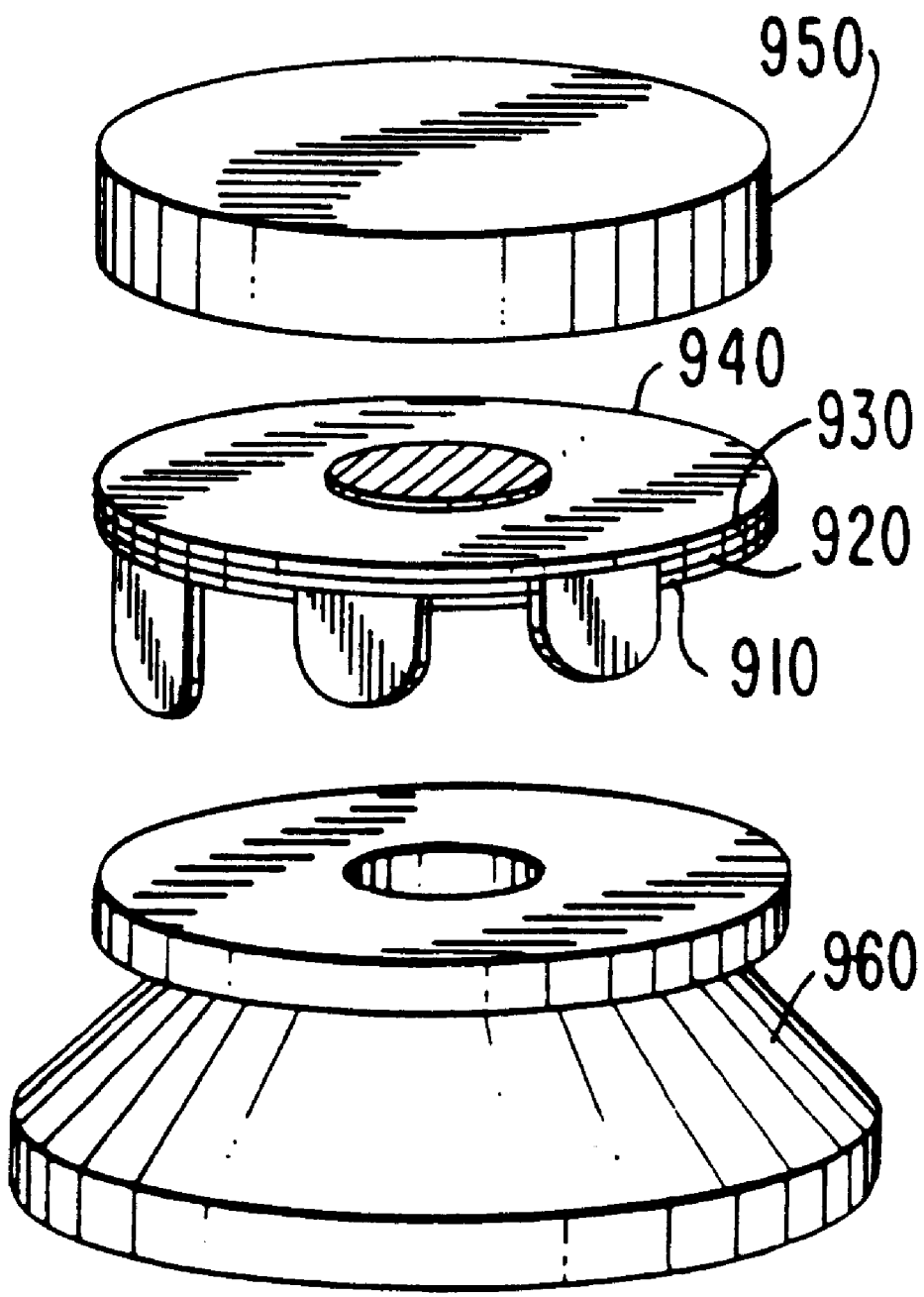
FIG. 10 is a perspective view of the calibration and verification apparatus shown in FIG. 9 where the apparatus is in an assembled configuration.

According to another embodiment of this invention, FIGS. 9 and 10 show calibration and verification apparatus 900. FIG. 9 is an exploded perspective view of apparatus 900 and FIG. 10 is an assembled perspective view of apparatus 900. Apparatus 900 includes release liner 910, sanitary layer 920, photosensitive layer 930, color standard 940, and cap 950. As discussed more fully below, while release liner 910, sanitary layer 920, and cap 950 are preferred components of apparatus 900, they are optional according to this invention.

Release liner 910 has first surface 912, which faces downward in FIG. 9, and second surface 914, which faces upward in FIG. 9. Preferably, first surface 912 of release liner 910 attaches to distal surface 962 of color measuring instrument head 960, which includes round window 963 through which color measurements are made. Release liner 910 is preferably optically opaque to prevent a photosensitive surface of layer 930 from being exposed to sufficient electromagnetic radiation to expose it enough to change its color substantially before apparatus 900 is used.

Sanitary layer 920 has first surface 922, which faces downward in FIG. 9, and second surface 924, which faces upward in FIG. 9. Sanitary layer 920 has first optically transparent aperture 926, such as a hole, for exposing photosensitive layer 930 and color standard 940 when used as described below. Second surface 914 of release liner 910 can be attached to first surface 922 of sanitary layer 920 with an adhesive, or any other conventional means. It will be appreciated that while release liner 910 and sanitary layer 920 are attached, they can be separated as desired. For example, when liner 910 and layer 920 are attached to each other by an adhesive, they can be separated without destroying sanitary layer 920 by simply pulling tab 918 of release liner 910.

Photosensitive layer 930 has first surface 932, which faces downward in FIG. 9, and second surface 934, which faces upward in FIG. 9. Layer 930 is preferably mounted so that first surface 932 faces second surface 924 of sanitary layer 920. First surface 932 has at least a first photosensitive color disposed thereon. Also, layer 930 has second optically transparent aperture 936 that has a cross-sectional area that is smaller than the cross-sectional area of first optically transparent aperture 926.

Preferably, region 935 of layer 930 changes color in a known way when exposed to a predetermined dose of light. One example of a photosensitive paper that can be used in accordance with this invention is sold under the name "polycontrast 3RC E," which is available from the Eastman Kodak Company, of Rochester, N.Y. In this case, the region of photosensitive layer exposed to visible light will darken a known amount when the it is exposed to a predetermined dose of light.

Color standard 940 has first surface 942, which faces downward in FIG. 9, and second surface 944, which faces upward in FIG. 9. Layer 940 is mounted so that its first surface 942 is facing second surface 934 of layer 930. Furthermore, standard 940 is mounted so that region 946 of first surface 942 is adjacent second aperture 936. In this way, region 946 can measured through second aperture 936 during operation. Region 935 of photosensitive layer 930 preferably changes color in a known way when exposed to a predetermined dose of light, such as a predetermined number of flashes of light emitted by a color measuring instrument. It will be appreciated that first surface 942 of standard 940 can be attached to second surface 934 of layer 930 with adhesive. Second surface 924 of sanitary layer 920 can be removably attached to first surface 942 of layer 930 with adhesive.

The sizes of various components used in accordance with this invention are now described. The area within aperture 926 is preferably larger than the area within window 963 so that inner rim 927 of layer 920 does not interfere with color measurements. Also, the area within aperture 936 is preferably smaller than the area within window 963 to ensure that at least a portion of photosensitive region 935 is exposed during color measurements. To ensure that a light-tight seal is formed when layer 930 and standard 940 are combined, the surface area of color standard 940 is preferably at least as large as the area within aperture 936. And, to ensure accurate calibration and verification, the surface area of region 946 is preferably larger than the surface area of region 935.

Optional cap 950 has inner surface 952, which faces downward in FIG. 9, and is adapted to substantially fit over at least second aperture 936, which further provides an opaque back surface for the color standard.

A method according to this invention for calibrating and verifying via calibration and verification apparatus 900 is now described. To some extent the method has already been discussed above, so the description here is somewhat abbreviated. After mounting the apparatus on the instrument so that the first surface of the sanitary layer faces a head of the instrument; the method includes calibrating the instrument with the apparatus; exposing at least the second region with light; and verifying that the color standard used in calibration is an authorized color standard of the predetermined specification and that the calibration of the color measurement instrument has achieved predetermined specified results.

When the apparatus 900 includes release liner 910, the method also includes removing the release liner from the first surface of the sanitary layer before mounting the apparatus.

When apparatus 900 is mounted to instrument head 960, it is preferably temporarily attached, such as via an adhesive or by some other fastening means, such as a clip. Regardless of the particular fastening means used to attach apparatus 900 to head 960, the individual layers should be easily removable as described herein.

During the calibrating step, unexposed color measurement value(s) of a first known portion, including the photosensitive region, is determined. As used herein, unexposed color measurement value(s) is the color measurement value(s) that characterizes the portion before being exposed to a sufficient dose of electromagnetic energy to expose it and change its color substantially in the exposing step.

In the exposing step, the known dose of electromagnetic energy can be provided by one or more flashes emitted by the color measuring instrument. Color measurements can be made at any time during the calibration and verification procedure, including after any number of flashes, as a further check that the color standard being used is unexposed.

In the verifying step, exposed color measurement value(s) of a second known portion is determined. The second known portion can be identical to the first known portion. As used herein, exposed color measurement value(s) is the color measurement value(s) that characterizes the color of the second known portion after being exposed to sufficient electromagnetic energy in the exposing step to expose it and substantially change its color.

If it is determined that the color standard being used to calibrate a color measuring instrument is unexposed, the instrument can be programmed to continue the calibration and verification procedure. On the other hand, if it is determined that the color standard being used to calibrate a color measuring instrument has been exposed prior to a calibration or becomes exposed other than in a known way with a predetermined dose of light, the instrument can be programmed to discontinue the calibration and verification procedure, such as by rejecting the color standard.

Figure 11:
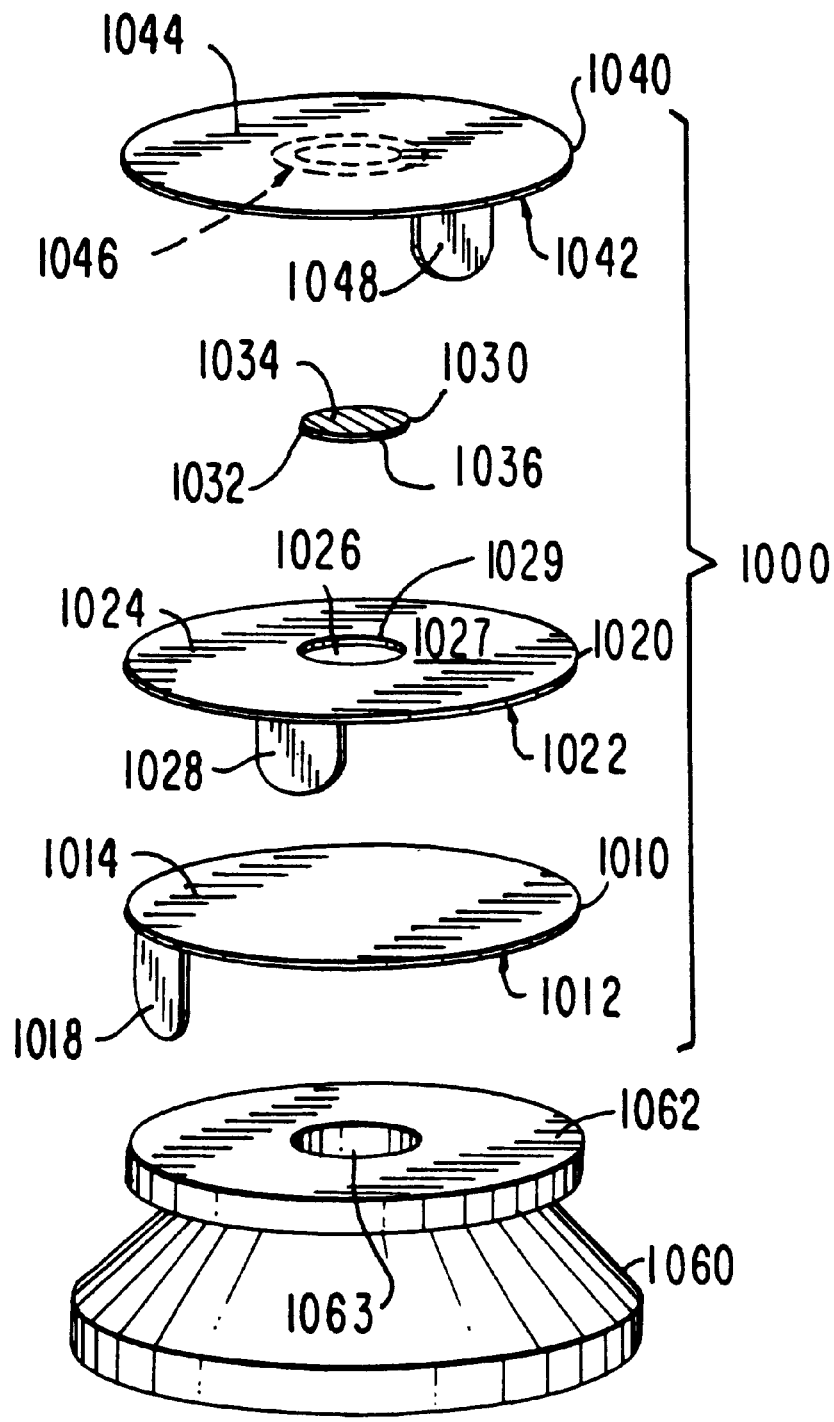
FIG. 11 is an exploded perspective view of yet another illustrative embodiment of a calibration and verification apparatus using a photosensitive layer in accordance with this invention.
Figure 12:
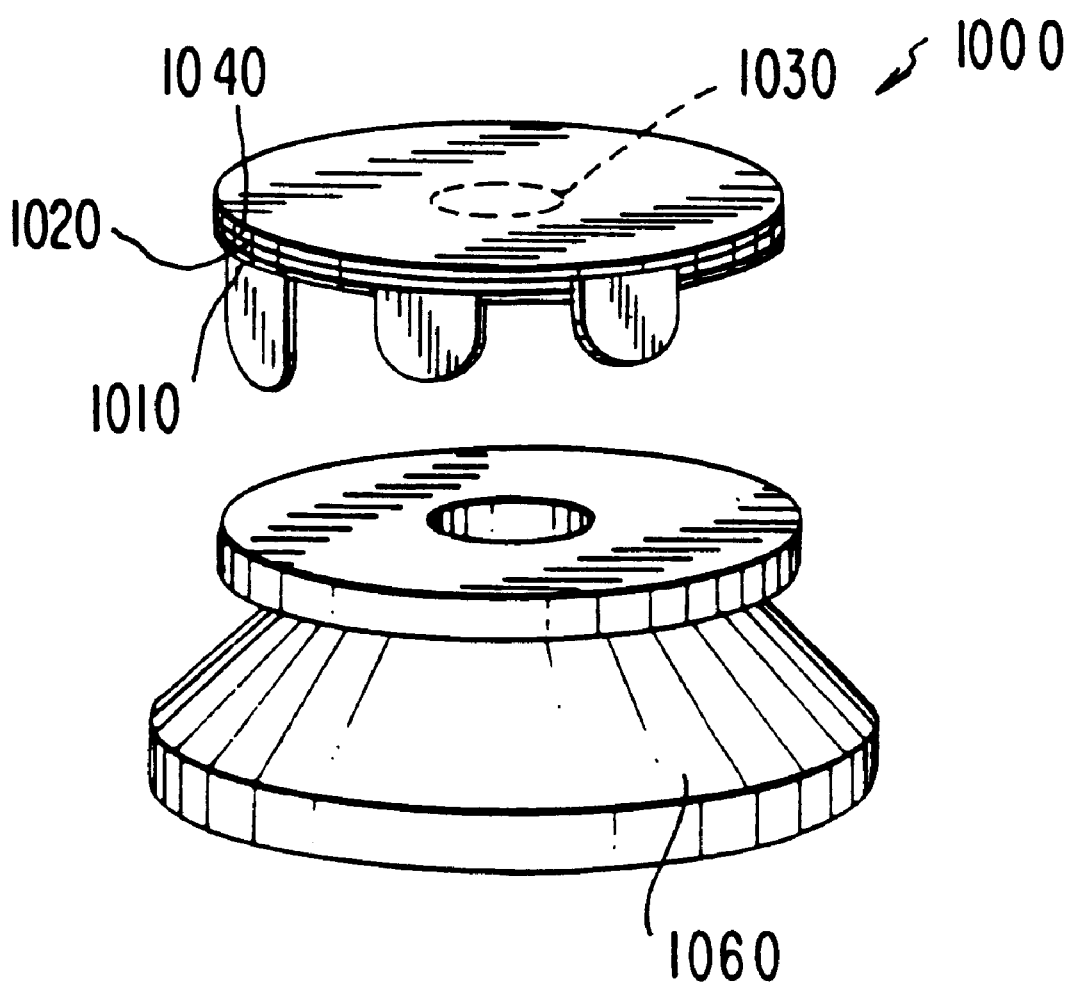
FIG. 12 is a perspective view of the calibration and verification apparatus shown in FIG. 11 where the apparatus is in an assembled configuration.

According to yet another embodiment of this invention, FIGS. 11 and 12 show calibration and verification apparatus 1000. FIG. 11 is an exploded perspective view of apparatus 1000 and FIG. 12 is an assembled perspective view of apparatus 1000. Apparatus 1000 includes release liner 1010, sanitary layer 1020, color standard 1030, and photosensitive layer 1040. A cap (not shown in FIGS. 11 and 12) can also be used according to this embodiment of the invention, but is optional. Also, while release liner 1010 and sanitary layer 1020 are preferred components of apparatus 1000, they are also optional according to this invention.

Release liner 1010 has first surface 1012, which faces downward in FIG. 11, and second surface 1014, which faces upward in FIG. 11. Preferably, first surface 1012 of release liner 1010 attaches to distal surface 1062 of color measuring instrument head 1060, which includes round window 1063 through which color measurements are made. Like release liner 910, 1010 is preferably substantially optically opaque, to prevent photosensitive surface of layer 1040 from being exposed to electromagnetic radiation before calibrating a color measuring instrument with apparatus 1000.

Sanitary layer 1020 has first surface 1022, which faces downward in FIG. 11, and second surface 1024, which faces upward in FIG. 10. Sanitary layer 1020 has optically transparent aperture 1026, such as a hole or transparent film, for exposing color standard 1030 and photosensitive layer 1040 when used as described below. Second surface 1014 of release liner 910 can be attached to first surface 1022 of sanitary layer 1020 with an adhesive, or any other conventional means. It will be appreciated that while release liner 1010 and sanitary layer 1020 are attached, they can be separated if and when desired. For example, when liner 1010 and layer 1020 are attached to each other by an adhesive, they can be separated without destroying sanitary layer 1020 by simply pulling tab 1018 of release liner 1010.

Color standard 1030 has first surface 1032, which faces downward in FIG. 11, and second surface 1034, which faces upward in FIG. 11. Standard 1030 is mounted so that its first surface 1032 faces second surface 1024 of sanitary layer 1020. Furthermore, standard 1030 is mounted so that region 1036 of first surface 1032 is adjacent aperture 1026. In this way, region 1036 can be exposed to light though aperture 1026 during operation. Like first surface 932 of color standard 930, the color of first surface 1032 of color standard 1030 should at least have a first color disposed thereon which is characterized by a first predetermined coloration having premeasured color measurement value(s).

Photosensitive layer 1040 has first surface 1042, which faces downward in FIG. 11, and second surface 1044, which faces upward in FIG. 11. Layer 1040 is preferably mounted so that first surface 1042, which includes a photosensitive region, faces second surfaces 1024 and 1034. At least a part of photosensitive region 1046 must be exposed during the exposing step. In this embodiment, the part of photosensitive region 1046 that is exposed is annular. As already discussed above with respect to apparatus 900, photosensitive portion 1046 of layer 1040 changes color in a known way when exposed to a predetermined dose of visible light. Layer 1040 can have tab portion 1048 for a user to grasp when removal is desired.

Second surface 1024 of sanitary layer 1020 can be removably attached to at least one of first surfaces 1032 and 1042. When a sanitary layer is not used in accordance with this invention, the technician calibrating the instrument can sterilize the skin, and/or the color measuring instrument head, with a sterilizing agent (e.g., alcohol).

The sizes of various components used in accordance with this invention are now described. The area within aperture 1026 may be larger than the area within window 1063 so that inner rim 1029 of layer 1020 does not interfere with color measurements. Also, to ensure that at least a portion of photosensitive region 1046 is exposed during color measurements, the surface area of region 1036 may be smaller than the area within aperture 1026. And finally, to ensure accurate calibration and verification, the surface area of region 1036 may be larger than the surface area of region 1046.

Figure 13:
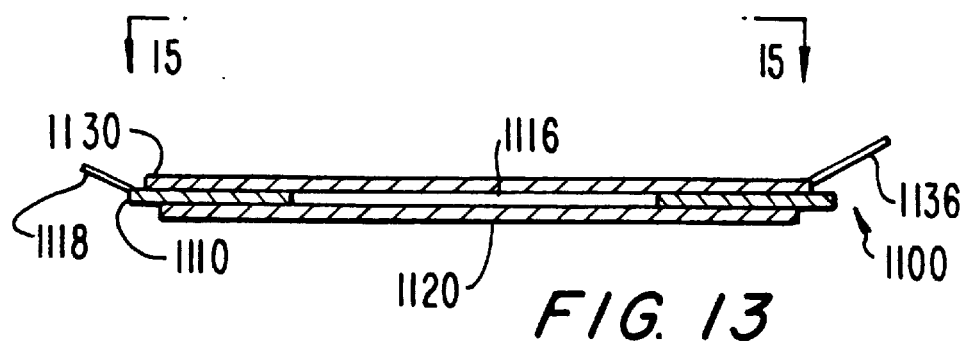
FIG. 13 is a cross-sectional side view of yet a further illustrative embodiment of a calibration and verification apparatus using a photosensitive layer in accordance with this invention, where the apparatus is in an assembled configuration.
Figure 14:
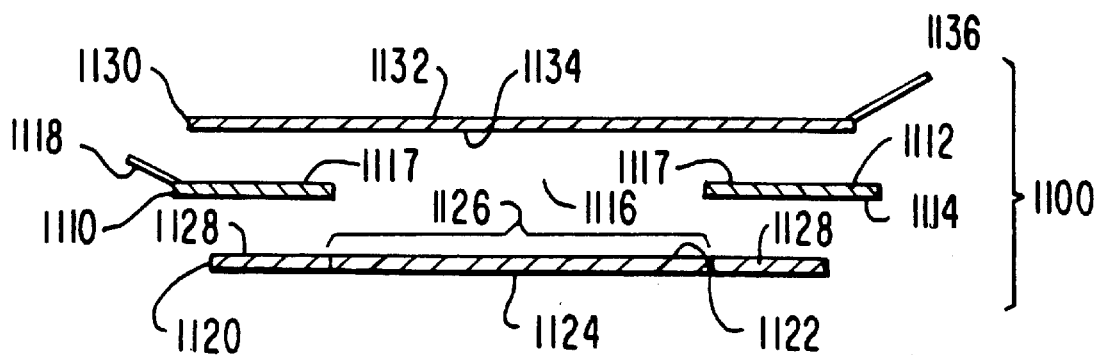
FIG. 14 is a cross-sectional exploded side view of the calibration and verification apparatus shown in FIG. 13.
Figure 15:
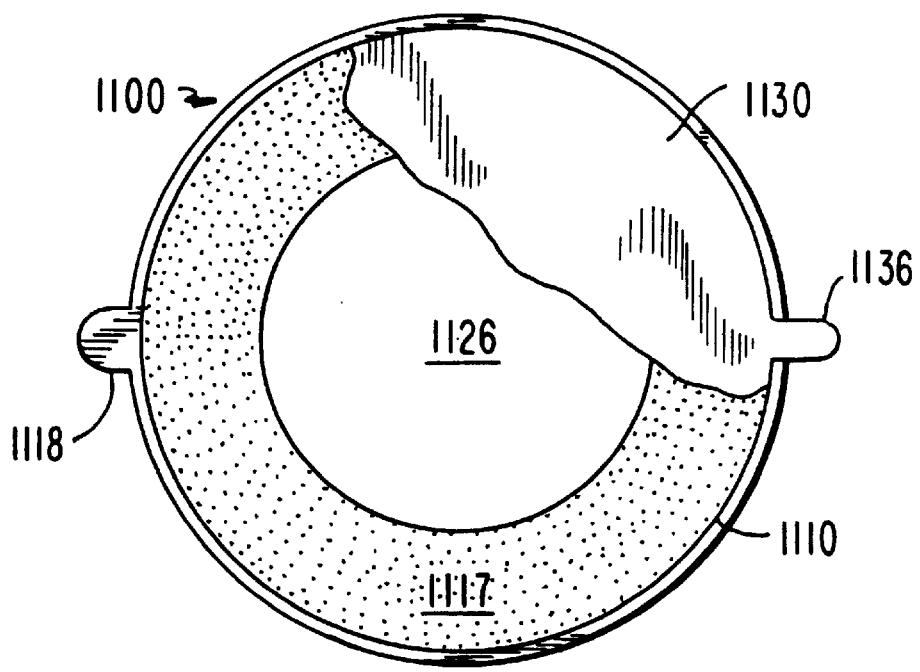
FIG. 15 is a top view, partly in section, of the calibration and verification apparatus shown in FIG. 13.

According to a further embodiment of this invention, FIGS. 13–15 show calibration and verification apparatus 1100. As shown best in FIGS. 13 and 14, apparatus 1100 can include photosensitive layer 1110, color standard 1120, and release liner 1130.

Photosensitive layer 1110 has first surface 1112, second surface 1114, and an optically transparent aperture 1116. First surface 1112 has at least a first region that is photosensitive. Second surface 1114 is preferably attached to annular portion 1128 of first surface 1122 with any conventional adhesive. Region 1117 of first surface 1112 preferably changes color in a known way when exposed to a predetermined dose of light. In particular, that region preferably changes color in a known amount (such as by darkening or lightening it) when region 1117 is exposed to a predetermined dose of visible light. As shown in FIG. 15, region 1117 can be annular.

Color standard 1120 has first surface 1122 and second surface 1124. First surface 1122 is mounted so that it faces second surface 1114 of layer 1110 and so that first portion 1126 of standard 1120 is adjacent optically transparent aperture 1116. First surface 1112 can have one or more different colors characterized by predetermined coloration having premeasured color measurement value(s). A sanitary layer (not shown) can also be included to prevent transmission of germs and such between patients as explained above and shown in FIGS. 9–12, for example.

Second surface 1134 of release liner 1130 is preferably releasably mounted so that it faces first surface 1112 in such a way that it prevents light from becoming incident on annular region 1117 of photosensitive layer 1110 when liner 1130 is attached. To ensure accurate calibration and verification, the surface area of region 1117 is preferably smaller than region 1126 and region 1126 is preferably centrally located. Therefore, release liner 1130 is preferably substantially opaque to visible light and forms a light tight seal with photosensitive 1120, such as with a releasable adhesive. Also, release liner 1130 can also include tab 1136 so that a user can easily remove liner 1130 from photosensitive layer 1110 and color standard 1120 before calibration or verification. Apparatus 1100 can further include a cap (not shown).

Figure 16:
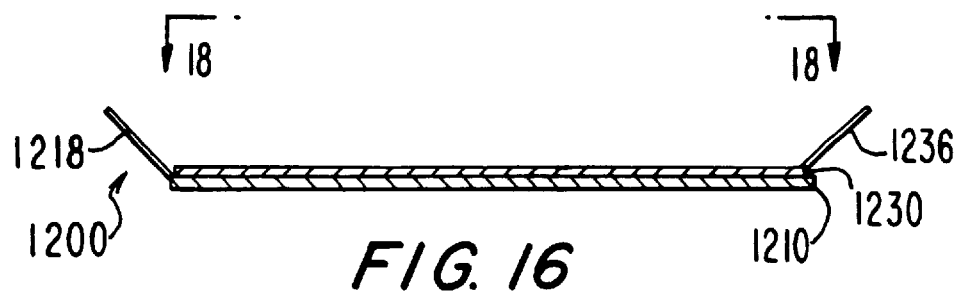
FIG. 16 is a cross-sectional side view of yet a further illustrative embodiment of a calibration and verification apparatus using a photosensitive portion in accordance with this invention, where the apparatus is in an assembled configuration.
Figure 17:
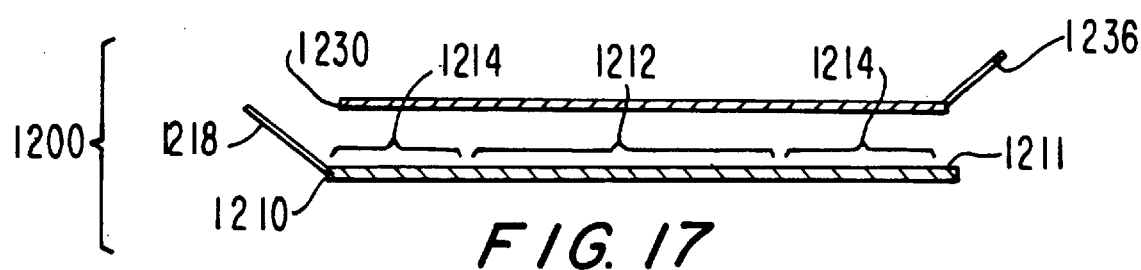
FIG. 17 is a cross-sectional exploded side view of the calibration and verification apparatus shown in FIG. 16.
Figure 18:
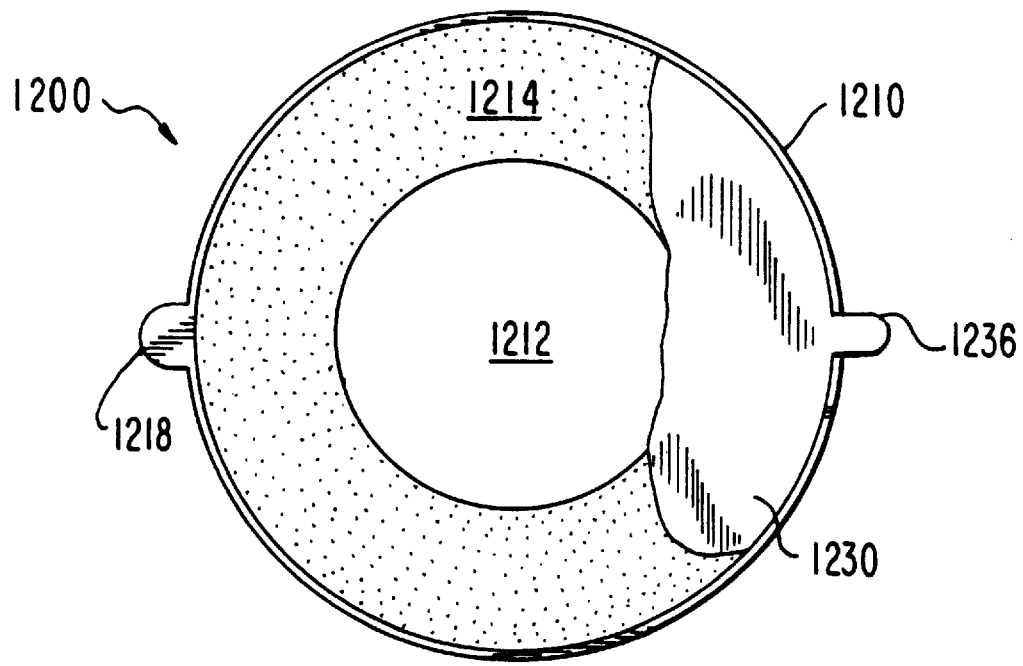
FIG. 18 is a top view, partly in section, of the calibration and verification apparatus shown in FIG. 16.

According to a another embodiment of this invention, FIGS. 16–18 show calibration and verification apparatus 1200. As shown best in FIGS. 16 and 17, apparatus 1200 can include color standard 1210 and release liner 1230. Apparatus 1200 is essentially the same as apparatus 1100, except that apparatus 1100 includes a color standard with an integrated photosensitive portion.

Color standard 1210 has surface 1211 with at least first region 1212 and second region 1214. First region 1212 has at least a first color characterized by a first predetermined coloration having premeasured color measurement value(s). First region 1212 of surface 1211 can have two or more different colors, including a second color characterized by a second predetermined coloration having premeasured color measurement value(s). Second region 1214 is photosensitive. To ensure accurate calibration and verification, the surface area of region 1214 is preferably smaller than region 1212 and region 1212 is preferably centrally located. A sanitary layer (not shown) can also be included to prevent transmission of germs and such between patients as explained above and shown in FIGS. 9–12, for example.

Release liner 1230 is preferably releasably mounted so that it faces surface 1211 of color standard 1210 in such a way that it prevents light from becoming incident on second portion 1214 when liner 1230 is mounted or attached to color standard 1210. Therefore, release liner 1230 is preferably substantially opaque to visible light and forms a light tight seal with color standard 1210 on first portion 1214. Also, release liner 1230 can also include tab 1236 so that a user can easily remove liner 1230 from color standard 1210 before calibration or verification. Apparatus 1200 can include a cap (not shown) for handling color standard 1210 during calibration and verification.

Figure 19:
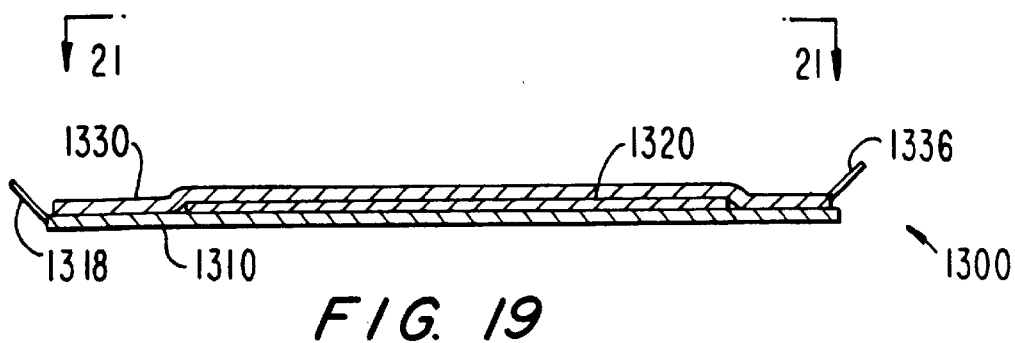
FIG. 19 is a cross-sectional side view of yet a further illustrative embodiment of a calibration and verification apparatus using a photosensitive layer in accordance with this invention, where the apparatus is in an assembled configuration.
Figure 20:
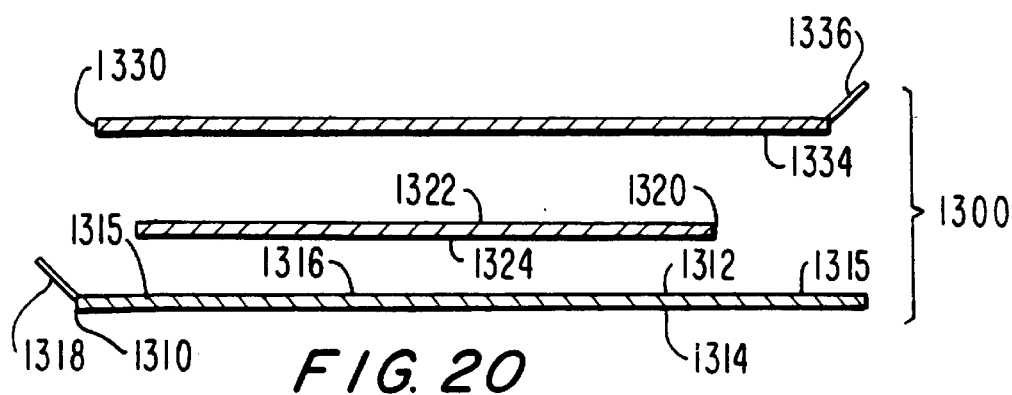
FIG. 20 is a cross-sectional exploded side view of the calibration and verification apparatus shown in FIG. 19.
Figure 21:
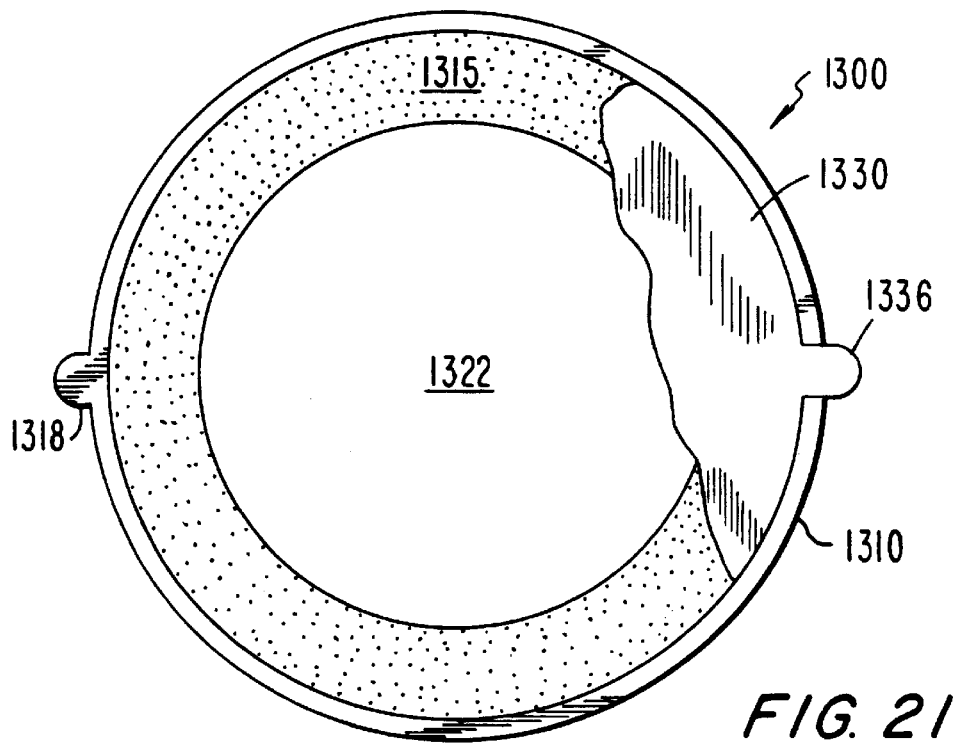
FIG. 21 is a top view, partly in section, of the calibration and verification apparatus shown in FIG. 19.

According to a further embodiment of this invention, FIGS. 19–21 show calibration and verification apparatus 1300. As shown best in FIGS. 19 and 20, apparatus 1300 can include photosensitive layer 1310, color standard 1320, and release liner 1330.

Photosensitive layer 1310 has first surface 1312, second surface 1314. First surface 1312 has at least first region 1315 that is photosensitive.

Color standard 1320 has first surface 1322 and second surface 1324. Second surface 1324 is attached to first portion 1316 of layer 1310. In this way, first surface 1322 is mounted so that it faces the same direction as first surface 1312. This arrangement allows a simultaneous color measurement, if desired. First surface 1322 can have one or more colors characterized by predetermined colorations having premeasured color measurement value(s). To ensure accurate calibration and verification, the surface area of annular region 1315 is preferably smaller, and most preferably substantially smaller, than region 1322 and region 1322 is preferably centrally located. It will be appreciated that photosensitive region can be any shape and therefore need not be annular.

A sanitary layer (not shown) can also be releasably attached to a portion of first surface 1312 of color standard 1310 to prevent transmission of germs and such between patients as described above and shown in FIGS. 9–12, for example.

As shown best in FIG. 19, second surface 1334 of release liner 1330 is preferably releasably mounted so that it faces first surface 1312 of layer 1310 in such a way that it blocks light from becoming incident on region 1315 of photosensitive layer 1310 when liner 1330 is attached.

Apparatus 1300 can also include a cap (not shown). The use of a cap can help a user align apparatus 1300 on the head of the color measuring instrument, and provide a substantially opaque back surface for the apparatus.

Thus, it is apparent that there has been provided, in accordance with the invention, methods and apparatus of color calibration and verification that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A method of calibrating a color measuring instrument with a color standard and verifying said color standard and said calibration, said method comprising:

providing a color standard having a surface with at least two different colors arranged for a simultaneous color measurement;

calibrating said instrument with said color standard; and verifying that said color standard used in calibration is an authorized color standard of a predetermined specification and that the calibration of the color measurement instrument has achieved predetermined specified results, said steps of calibrating and verifying being performed by either sequential (1) exclusion and inclusion or (2) inclusion and exclusion of predetermined color measurement values of a portion of said color standard.

2. The method of claim 1 wherein said providing comprises:

providing a color standard having a first of said colors characterized by a first predetermined coloration having premeasured color measurement value(s) and a second of said colors characterized by a second predetermined coloration having premeasured color measurement value(s).

3. The method of claim 2 wherein said calibrating comprises:

measuring at least a first known and predetermined portion of said color standard surface to obtain preliminary calibration color measurement value(s);

adjusting the instrument output to correspond to previously established calibrations, using said portion of said color standard;

remeasuring said portion of said color standard to obtain calibration color measurement value(s); and comparing said calibration color measurement value(s) with a calibration's premeasured color measurement value(s) for the same known and predetermined portion of said color standard surface to ensure that said calibration color measurement value(s) and said calibration's premeasured color measurement value(s) is substantially the same and therefore to ensure that calibration has achieved predetermined specified results.

4. The method of claim 3 wherein said verifying comprises:

measuring at least a second known and predetermined portion of said color standard surface to obtain verification color measurement value(s), and determining that said verification color measurement value(s) is substantially equal to a verification's premeasured color measurement value(s) for the same known and predetermined portion of the said color standard surface.

5. The method of claim 2 wherein said providing comprises providing a color standard wherein said at least two colors of predetermined coloration are disposed on said color standard surface in a known ratio of surface areas.

6. The method of claim 2 wherein said providing comprises providing a color standard wherein said at least two colors of predetermined coloration are disposed on said color standard surface in a known configuration of surface areas.

7. The method of claim 6 wherein said providing comprises providing a color standard wherein said at least two colors of predetermined coloration are disposed on said color standard surface with a known radial disposition.

8. The method of claim 7 wherein said providing comprises providing a color standard wherein said first color of predetermined coloration is on a central region that is centrally located on said standard surface and wherein said second color of predetermined coloration is disposed on an outer region that is radially outside said central region.

9. The method of claim 8 wherein said providing comprises providing a color standard wherein said second color of predetermined coloration is disposed on an annular region of said standard surface.

10. The method of claim 8 wherein said providing comprises providing a color standard wherein said centrally located region has a surface area that is larger than a surface area of said annular region.

11. The method of claim 6 wherein said providing comprises providing a color standard wherein said first color of predetermined coloration is disposed on at least two noncontiguous regions on said color standard surface.

12. The method of claim 11 wherein said providing comprises providing a color standard wherein said second color of predetermined coloration is disposed on at least two additional noncontiguous regions on said color standard surface.

13. The method of claim 12 wherein said providing comprises providing a color standard wherein said colors of predetermined coloration on said standard surface have a mottled appearance.

14. The method of claim 6 wherein said providing comprises providing a color standard wherein said first color of predetermined coloration is disposed on at least two contiguous regions on said color standard surface.

15. The method of claim 4 wherein said measuring a first known portion comprises masking said second known portion with a mask.

16. The method of claim 15 wherein said calibrating comprises measuring a first known portion wherein said first known portion is a region on which said first color of predetermined coloration is disposed.

17. The method of claim 16 wherein said verifying comprises measuring a second known portion wherein said second known portion is a region on which said second color of predetermined coloration is disposed.

18. The method of claim 15 wherein said verifying comprises measuring a second known portion wherein said second known portion is a portion on which said first color of predetermined coloration and said second color of predetermined coloration are disposed.

19. The method of claim 15 wherein said verifying comprises measuring a second known portion consisting essentially of a region on which said second color of predetermined coloration is disposed.

20. The method of claim 15 wherein said verifying comprises measuring a second known portion consisting essentially of a portion on which a predetermined combination of said first color of predetermined coloration and said second color of predetermined coloration is disposed.

21. The method of claim 15 wherein said calibrating comprises measuring a first known portion wherein said first known portion is a region on which said second color of predetermined coloration is disposed.

22. The method of claim 21 wherein said verifying comprises measuring a second known portion wherein said second known portion is a region on which Salid first color of predetermined coloration is disposed.

23. The method of claim 21 wherein said verifying comprises measuring a second known portion wherein said second known portion is a portion on which said first color of predetermined coloration and said second color of predetermined coloration are disposed.

24. The method of claim 21 wherein said verifying comprises measuring a second known portion consisting essentially of a portion on which said first color of predetermined coloration is disposed.

25. The method of claim 21 wherein said verifying comprises measuring a second known portion, consisting essentially of a portion on which a predetermined combination of said first color of predetermined coloration and said second color of predetermined coloration is disposed.

26. The method of claim 15 wherein said calibrating comprises measuring a first known portion wherein said first known portion is a portion on which said first color of predetermined coloration and said second color of predetermined coloration are disposed.

27. The method of claim 15 wherein said calibrating comprises measuring a first known portion, wherein said first known portion is selected from a group consisting essentially of a portion on which said first color of predetermined coloration is disposed, a portion on which said second color of predetermined coloration is disposed, and a portion on which a predetermined combination of said first color of predetermined coloration and said second color of predetermined coloration is disposed.

28. The method of claim 27 wherein said calibrating comprises measuring a first known portion consisting essentially of a portion on which said first color of predetermined coloration is disposed.

29. The method of claim 27 wherein said calibrating comprises measuring a first known portion consisting essentially of a portion on which said second color of predetermined coloration is disposed.

30. The method of claim 27 wherein said calibrating comprises measuring a first known portion consisting essentially of a portion on which said predetermined combination is disposed.

31. The method of claim 15 wherein said mask has an aperture, said measuring a first known portion comprises positioning said mask adjacent said color standard surface so that-said first known portion is measurable and said second known portion is not measurable.

32. The method of claim 31 wherein said first known portion is one of a plurality of calibration portions disposed on said color standard surface and said mask has a plurality of operable positions that correspond to said calibration portions, and wherein said positioning comprises positioning said mask in one of said plurality of operable positions to select one of said calibration portions.

33. The method of claim 4 wherein said measuring a second known portion comprises masking said first known portion with a mask.

34. The method of claim 33 wherein said verifying comprises measuring a second known portion wherein said second known portion is a region on which said first color of predetermined coloration is disposed.

35. The method of claim 33 wherein said verifying comprises measuring a second known portion wherein said second known portion is a region on which said second color of predetermined coloration is disposed.

36. The method of claim 33 wherein said verifying comprises measuring a second known portion wherein said second known portion is a portion on which said first color of predetermined coloration and said second color of predetermined coloration are disposed.

37. The method of claim 33 wherein said verifying comprises measuring a second known portion, wherein said second known portion is selected from a group consisting essentially of a portion on which said first color of predetermined coloration is disposed, a portion on which said second color of predetermined coloration is disposed, and a portion on which a predetermined combination of said first color of predetermined coloration and said second color of predetermined coloration is disposed.

38. The method of claim 37 wherein said verifying comprises measuring a second known portion consisting essentially of a portion on which said first color of predetermined coloration is disposed.

39. The method of claim 37 wherein said verifying comprises measuring a second known portion consisting essentially of a portion on which said second color of predetermined coloration is disposed.

40. The method of claim 37 wherein said verifying comprises measuring a second known portion consisting essentially of a portion on which said predetermined combination is disposed.

41. The method of claim 36 wherein said mask has an aperture, said measuring a second known portion comprises positioning said mask adjacent said color standard surface so that said second known portion is measurable and said first known portion is not measurable.

42. The method of claim 41 wherein said second known portion is one of a plurality of calibration portions disposed on said color standard surface and said mask has a plurality of operable 1) positions that correspond to said calibration portions, and wherein said positioning comprises positioning said mask in one of said operable positions to select one of said calibration portions.

43. The method of claim 4 wherein said first known portion and said second known portion are the same.

44. The method of claim 43 wherein said determining that said verification color measurement value(s) is substantially equal comprises:
calculating computed color measurement value(s) based on said verification color measurement value(s); and
determining that said computed color measurement value(s) are substantially equal to said verification's premeasured color measurement value(s).

45. The method of claim 44 wherein said first known portion is selected from a group consisting essentially of a portion on which said first color is disposed, a portion on which said second color is disposed, and a portion on which a predetermined combination of said first color of predetermined coloration and said second color of predetermined coloration is disposed.

46. The method of claim 45 wherein said calculating computed color measurement value(s) comprises adding predetermined differential color measurement value(s) to said verification color measurement value(s) to obtain said computed color measurement value(s).

47. The method of claim 46 wherein said predetermined differential color measurement value(s) is at least partially based on said first predetermined coloration's premeasured color measurement value(s), said second predetermined colorations's premeasured color measurement value(s), or a combination thereof.

48. The method of claim 45 wherein said determining of said calculated color measurement value(s) comprises subtracting said predetermined differential color measurement value(s) from said verification color measurement value(s) to obtain said computed color measurement value(s).

49. The method of claim 48 wherein said first known portion consists essentially of a portion on which said predetermined combination of said first color of predetermined coloration and said second color of predetermined coloration is disposed, and wherein said predetermined differential color measurement value(s) is at least partially based on said first predetermined coloration's premeasured color measurement value(s).

50. The method of claim 48 wherein said first known portion consists essentially of a portion on which said predetermined combination of said first color of predetermined coloration and said second color of predetermined coloration is disposed, and wherein said predetermined differential color measurement value(s) are at least partially based on said second predetermined coloration's premeasured color measurement value(s).

51. The method of claim 4 wherein said providing a color standard comprises providing a color standard having at least two different colors, a first of said colors being disposed on a first surface of said color standard and being characterized by a first predetermined coloration having premeasured color measurement value(s) and a second of said colors being disposed on a second surface of said color standard and being characterized by a second predetermined coloration having premeasured color measurement value(s).

52. The method of claim 51 wherein said measuring a first known portion comprises measuring at least said first known and predetermined portion of said first surface of said color standard to obtain said calibration color measurement value(s).

53. The method of claim 51 wherein said measuring a second known portion comprises measuring at least said second known and predetermined portion of said second surface of said color standard to obtain said verification color measurement value(s).

54. The method of claim 51 wherein said color standard first surface and said color standard second surface are separable.

55. The method of claim 51 wherein said color standard first surface and said color standard second surface are inseparable.

56. The method of claim 55 wherein said inseparable first and second surfaces are disposed on opposite sides of a flat substrate.

57. The method of claim 1 wherein said color measuring instrument has a head with a window, said providing a color standard comprises providing a color standard having at least two different colors arranged for a simultaneous color measurement within said window.

58. The method of claim 57 wherein said window has a substantially round shape, said providing a color standard comprises providing a color standard having at least two different colors arranged for a simultaneous color measurement within said substantially round window.

59. The method of claim 1 wherein said at least two different colors includes a first color having a first surface area and a second color having a second surface area, said providing comprises providing a color standard wherein said first surface area is substantially larger than said second surface area.

60. The method of claim 1 wherein said providing comprises:
providing a color standard having a first color that is characterized by a first predetermined coloration having premeasured color measurement value(s) and a second color that is photosensitive.

61. The method of claim 60 wherein said calibrating comprises measuring a known and predetermined portion of said color standard to obtain calibration color measurement value(s), and wherein said verifying comprises measuring said portion to obtain verification color measurement value (s), said method further comprising:
exposing at least said second color to a predetermined dose of light for verification after calibration such that said calibration color measurement value(s) and said verification color measurement value(s) are different.

62. The method of claim 60 wherein said first color has a first surface area and said second color has a second surface area, said providing comprises providing a color standard wherein said first surface area is larger than said second surface area.

63. The method of claim 62 wherein said providing comprises providing a color standard wherein said first surface area is substantially larger than said second surface area.

64. The method of claim 60 wherein said calibrating comprises measuring a known and predetermined portion of said color standard to obtain calibration color measurement value(s), and wherein said verifying comprises measuring said portion to obtain verification color measurement value (s), said method further comprising:
exposing at least said second color to a predetermined dose of light after said calibrating such that said calibration color measurement value(s) and said verification color measurement value(s) are different.

65. The method of claim 1 wherein said providing comprises providing a color standard that is substantially opaque to said light.

66. A method of calibrating a color measuring instrument with a color standard and verifying said color standard and said calibration, said method comprising:
providing a color standard having a surface with at least a first region and a second region, wherein said first region has a first color characterized by a first predetermined coloration having premeasured color measurement value(s), and wherein said second region is photosensitive so that it changes color in a known way when exposed to a predetermined dose of light, the change in color distinguishing the so exposed color standard from a color standard that has not been so exposed;
calibrating said instrument with said color standard;
exposing at least said second region with light; and
verifying that said color standard used in calibration is an authorized color standard of a predetermined specification and that the calibration of the color measurement instrument has achieved predetermined specified results.

67. The method of claim 66 wherein said providing comprises:
providing a color standard having said first color characterized by a first predetermined coloration having premeasured color measurement value(s) and a second color characterized by a second predetermined coloration having premeasured color measurement value(s).

68. The method of claim 67 wherein said calibrating comprises:
measuring at least a first known and predetermined portion of said color standard surface to obtain preliminary calibration color measurement value(s);
adjusting the instrument output to correspond to previously established calibrations, using said portion of said color standard;
remeasuring said portion of said color standard to obtain calibration color measurement value(s); and
comparing said calibration color measurement value(s) with a calibration's premeasured color measurement value(s) for the same known and predetermined portion of said color standard surface to ensure that said calibration color measurement value(s) and said calibration's premeasured color measurement value(s) is substantially the same and therefore to ensure that calibration has achieved predetermined specified results.

69. The method of claim 68 wherein said verifying comprises:
measuring at least a second known and predetermined portion of said color standard surface to obtain verification color measurement value(s), and determining that said verification color measurement value(s) is substantially equal to a verification's premeasured color measurement value(s) for the same known and predetermined portion of the said color standard surface.

70. The method of claim 66 wherein said calibrating comprises at least measuring a known and predetermined portion of said color standard to obtain calibration color measurement value(s), wherein said verifying comprises at least measuring said portion to obtain verification color measurement value(s), and wherein said exposing comprises exposing at least said second region to said predetermined dose of light for verification after calibration such that said calibration color measurement value(s) and said verification color measurement value(s) are different.

71. The method of claim 66 wherein at least one of said calibrating and verifying comprises measuring the color of said portion, wherein said portion comprises said first region and said second region, wherein said first region has a first surface area and said second region has a second surface area, said first surface area being larger than said second surface area.

72. The method of claim 66 wherein said providing comprises providing a color standard having a surface with at least two different colors arranged for a simultaneous color measurement.

73. The method of claim 66 wherein said color measuring instrument has a head with a window, said providing a color standard comprises providing a color standard having at least two different colors arranged for a simultaneous color measurement within said window.

74. The method of claim 17 wherein said window has a substantially round shape, said providing a color standard comprises providing a color standard having at least two different colors arranged for a simultaneous color measurement within said substantially round window.

75. The method of claim 66 wherein said providing comprises providing a color standard that is substantially opaque to light.

76. A method for calibration of a color measuring instrument and verification of the calibration using a color calibration and verification apparatus, said apparatus comprising:
- a color standard having a substantially opaque surface with at least two different colors arranged for simultaneous color measurement to sequentially calibrate the instrument with first predetermined color measurement value(s) of the color standard and verify the calibration with at least second and different predetermined color measurement value(s) of the color standard, and
- variance means to provide said first and second different color measurement values, said variance means being selected from the group consisting of: (1) sequential inclusion and exclusion of predetermined color measurement value(s) of a portion of said colors, (2) sequential exclusion and inclusion of predetermined color measurement value(s) of a portion of said colors, and (3) sequential exposure of photosensitive paper or material which provides at least one of said colors or portion of at least one of said colors, said photosensitive paper or material being capable of changing color in a known way when exposed to a predetermined dose of light, the chance in color distinguishing the so exposed color standard from a color standard that has not been so exposed, said method comprising the steps of:
- calibrating said instrument with said first predetermined color measurement value(s) of the color standard;
- causing the variance means to provide at least second and different predetermined color measurement value(s) of the color standard; and
- verifying the calibration of the color measurement instrument with said at least second and different predetermined color measurement value(s) of the color standard.

77. A method for calibrating a color measuring instrument and verifying the calibration of said instrument, said method comprising:
(a) providing a color standard having a substantially opaque surface with at least two different colors arranged for simultaneous color measurement;
(b) sequentially calibrating the instrument with first predetermined color measurement value(s) of the color standard and verifying the calibration with at least second and different predetermined color measurement value(s) of the color standard;
(c) providing variance means to provide said first and second different color measurement values, said variance means being selected from the group consisting of: (1) sequential inclusion and exclusion of at least the predetermined color measurement value(s) of a portion of said colors, (2) sequential exclusion and inclusion of at least the predetermined color measurement value(s) of the portion of said colors, and (3) sequential exposure of photosensitive paper or material which provides at least one of said colors or region or portion of said colors, said photosensitive paper or material being capable of changing color in a known way when exposed to a predetermined dose of light, the chance in color distinguishing the so exposed color standard from a color standard that has not been so exposed;
(d) calibrating said instrument with said first predetermined color measurement value(s) of the color standard;
(e) causing the variance means to provide at least second and different predetermined color measurement value(s) of the color standard; and
(f) verifying the calibration of the color measurement instrument with said at least second and different predetermined color measurement value(s) of the color standard.

78. A color calibration and verification apparatus for calibrating and verifying a color measuring instrument, said apparatus comprising a color standard having at least two different colors, wherein a first of said colors is characterized by a first predetermined coloration having premeasured color measurement value(s) and wherein a second of said colors is characterized by a second predetermined coloration having premeasured color measurement value(s), said second of said colors being photosensitive so that said second color changes color in a known way when exposed to a predetermined dose of light, the change in color distinguishing the so exposed color standard from such a color standard that has not been so exposed.

79. The apparatus of claim 78 wherein said colors are arranged for a simultaneous color measurement.

80. The apparatus of claim 78 wherein said at least two colors of predetermined coloration are disposed on said color standard surface in a known ratio of surface areas.

81. The apparatus of claim 78 wherein said at least two colors of predetermined coloration are disposed on said color standard surface in a known ratio of predetermined colorations.

82. The apparatus of claim 81 wherein said at least two colors of predetermined coloration are disposed on said color standard surface with a known radial disposition.

83. The apparatus of claim 78 wherein said first color of predetermined coloration is on a central region that is centrally located on said color standard surface and wherein said second color of predetermined coloration is disposed on an outer region that is radially outside said central region.

84. The apparatus of claim 83 wherein said central region has a surface area that is larger than a surface area of said outer region.

85. The apparatus of claim 83 wherein said second color of predetermined coloration is disposed on an annular region of said color standard surface.

86. The apparatus of claim 78 wherein said first color of predetermined coloration is disposed on at least two noncontiguous regions on said color standard surface.

87. The apparatus of claim 86 wherein said second color of predetermined coloration is disposed on at least two additional noncontiguous regions on said color standard surface.

88. The apparatus of claim 86 wherein said colors of predetermined coloration on said color standard surface has an appearance selected from a group consisting of mottled, continuously graded, variegated, and any combination thereof.

89. The apparatus of claim 78 wherein said color standard surface has a first known portion that is one of a plurality of calibration regions disposed on said color standard surface.

90. The apparatus of claim 78 wherein said first predetermined coloration's premeasured color measurement value(s) in CIE Hunter Lab space (1948) color coordinates have a lightness variable L that is greater than about 80.

91. The apparatus of claim 90 wherein said first color of predetermined coloration is partially provided by applying a highly reflecting coating or gloss finish to said color standard surface where said first color of predetermined coloration is disposed on said color standard surface, but not where said second color of predetermined coloration is disposed on said color standard surface.

92. The apparatus of claim 78 further comprising a color standard frame or rim, said frame or rim being mountable to a head of said instrument and said color standard being fastened to said frame or rim so that said color standard surface faces a sensor in said instrument head when said frame or rim is mounted to said head.

93. The apparatus of claim 92 wherein said color standard is permanently fastened to said frame or rim so that when said color standard is unfastened from said frame or rim in order to make a color measurement after said instrument is calibrated and said color standard and calibration is verified, said color standard will be destroyed, thereby ensuring that said color standard can only be used once for calibrating and verifying.

94. The apparatus of claim 93 wherein said authorized color standard is fastened with adhesive to said frame or rim.

95. The apparatus of claim 94 wherein said adhesive is permanent adhesive so that said color standard is-destroyed when said color standard is unfastened from said frame in order to make a color measurement after calibration and verification is performed.

96. The apparatus of claim 92 wherein said frame or rim is a variable aperture frame, said variable aperture frame comprising:
at least one fixed frame element that does not move relative to said head when said apparatus is mounted to said head; and
at least one movable frame element.

97. The apparatus of claim 96 wherein said at least one fixed frame element to which said color standard is fastened and wherein said at least one movable frame element is used to partially mask said color standard surface.

98. The apparatus of claim 97 wherein said at least one movable frame element has at least two masking positions, each of said masking positions causing a first known portion of said color standard surface to be available for measuring and a second known portion of said color standard surface not to be available for measuring.

99. The apparatus of claim 98 wherein said movable elements comprises two semi-circular elements.

100. The apparatus of claim 99 wherein one of said masking positions is when said semi-circular elements are positioned to form a substantially closed circle causing a first known portion of said color standard surface to be available for measuring and a second known portion of said color standard surface not to be available for measuring.

101. The apparatus of claim 99 wherein one of said masking positions is when said semi-circular elements are positioned to substantially form a circle that masks one of said known regions.

102. The apparatus of claim 97 wherein said variable aperture frame comprises an iris.

103. The apparatus of claim 97 wherein said movable element is a rotatable mask having an aperture, said mask has a plurality of operable positions that correspond to respective calibration regions on said color standard surface.

104. The apparatus of claim 96 wherein said at least one fixed frame element is used to partially mask said color standard surface and wherein said at least one movable frame element is fastened to said color standard.

105. The apparatus of claim 78 wherein at least one of said colors is that of a skin color that is close to the color of a skin color to be measured.

106. The apparatus of claim 105 wherein said first color and said second color is that of a skin color that is close to the color of a skin color to be measured.

107. The apparatus of claim 78 wherein said colors are arranged on at least one section and wherein said color standard has a substantially opaque back surface.

108. The apparatus of claim 107 wherein at least one of said colors is that of a skin color that is close to the color of a skin color to be measured.

109. The apparatus of claim 108 wherein said first color and said second color is that of a skin color that is close to the color of a skin color to be measured.

110. The apparatus of claim 107 wherein said at least two colors of predetermined coloration are disposed on at least one of a first and a second color standard surfaces in a known ratio of surface areas to each other.

111. The apparatus of claim 107 wherein said at least two colors of predetermined coloration are disposed on at least one of a first and a second color standard surfaces in a known ratio of said predetermined colorations to each other.

112. The apparatus of claim 107 wherein said at least two colors of predetermined coloration are disposed on at least one of a first and a second color standard surfaces in a known configuration.

113. The apparatus of claim 112 wherein said at least two colors of predetermined coloration are disposed on at least one of said first and said second color standard surfaces with a known radial disposition.

114. The apparatus of claim 107 wherein said first color of predetermined coloration is on a central portion that is centrally located on at least one of a first and a second color standard surfaces and wherein said second color of predetermined coloration is disposed on an outer portion that is radially outside said central portion.

115. The apparatus of claim 114 wherein said central portion has a surface area that is larger than a surface area of said outer portion.

116. The apparatus of claim 114 wherein said second color of predetermined coloration is disposed on an annular portion of at least one of said first and said second color standard surfaces.

117. The apparatus of claim 112 wherein said first color of predetermined coloration is disposed on at least two non-contiguous portions on at least one of said first and said second color standard surfaces.

118. The apparatus of claim 117 wherein said second color of predetermined coloration is disposed on at least two additional noncontiguous portions on at least one of said first and said second color standard surfaces.

119. The apparatus of claim 117 wherein said colors of predetermined coloration on at least one of said first and said second color standard surfaces has an appearance selected from a group consisting of mottled, continuously graded, variegated, and any combination thereof.

120. The apparatus of claim 107 wherein at least one of said first and said second color standard surfaces has a first known portion that is one of a plurality of calibration regions disposed on at least one of a first and a second color standard surfaces.

121. The apparatus of claim 107 wherein said first predetermined coloration's premeasured color measurement value(s) in CIE Hunter Lab space (1948) color coordinates have a lightness variable L that is greater than about 80.

122. The apparatus of claim 121 wherein said first color of predetermined coloration is partially provided by applying a highly reflecting coating or gloss finish to at least one of a first and a second color standard surfaces where said first color of predetermined coloration is disposed on at least one of said first and said second color standard surfaces, but not where said second color of predetermined coloration is disposed on at least one of said first and said second color standard surfaces.

123. The apparatus of claim 107 further comprising a color standard frame or rim, said frame or rim being mountable to a sensor head of said instrument and said color standard being fastened to said frame or rim so that at least one of a first and a second color standard surfaces faces a sensor in said instrument head when said frame or rim is mounted to said head.

124. The apparatus of claim 123 wherein said color standard is permanently fastened to said frame or rim so that when said color standard is unfastened from said frame or rim in order to make a color measurement after said instrument is calibrated and said color standard and calibration is verified, said color standard will be destroyed, thereby ensuring that said color standard can only be used to perform calibration and verification once.

125. The apparatus of claim 124 wherein a first portion of said color standard is fastened with adhesive to said frame or rim.

126. The apparatus of claim 125 wherein said adhesive is permanent adhesive so that said color standard is destroyed when a second portion of said color standard not attached to said frame with said adhesive is unfastened from said frame in order to make a color measurement after calibration and verification is performed.

127. The apparatus of claim 124 wherein said color standard is fastened with adhesive to said frame or rim.

128. The apparatus of claim 127 wherein said adhesive is such that said color standard is destroyed when said color standard is unfastened from said frame in order to make a color measurement after calibration and verification is performed.

129. The apparatus of claim 123 wherein said frame or rim is a variable aperture frame, said variable aperture frame comprising:
at least one fixed frame element that does not move relative to said head when said apparatus is mounted to said head; and
at least one movable frame element.

130. The apparatus of claim 129 wherein said at least one fixed frame element to which said color standard is fastened and wherein said at least one movable frame element is used to mask a portion of at least one of said first and said second color standard surfaces.

131. The apparatus of claim 130 wherein said at least one movable frame element has at least two masking positions, each of said masking positions causing a first known portion of at least one of said first and said second color standard surfaces to be available for measuring and a second known portion of at least one of said first and said second color standard surfaces not to be available for measuring.

132. The apparatus of claim 131 wherein said movable elements comprises two semi-circular elements.

133. The apparatus of claim 132 wherein one of said masking positions is when said semi-circular elements are positioned to form a substantially closed circle causing a first known portion of at least one of said first and said second color standard surfaces to be available for measuring and a second known portion of at least one of said first and said second color standard surfaces not to be available for measuring.

134. The apparatus of claim 132 wherein one of said masking positions is when said semi-circular elements are positioned to substantially form a circle that masks one of said known regions.

135. The apparatus of claim 130 wherein said variable aperture frame comprises an iris.

136. The apparatus of claim 130 wherein said movable element is a rotatable mask having an aperture, said mask has a plurality of operable positions that correspond to respective calibration regions on at least one of said first and said second color standard surfaces.

137. The apparatus of claim 129 wherein said at least one fixed frame element is used to mask a portion of at least one of said first and said second color standard surfaces and wherein said at least one movable frame element is fastened to said color standard.

138. The apparatus of claim 133 wherein said first surface area is substantially larger than said second surface area.

139. A color calibration and verification apparatus for calibrating and verifying a color measuring instrument, said apparatus comprising a color standard having a surface with at least a first region and a second region, wherein said first region has a first color characterized by a first predetermined coloration having premeasured color measurement value(s), and wherein said second region is photosensitive so that said second region changes color in a known way when exposed to a predetermined dose of light, the change in color distinguishing the so exposed color standard from a color standard that has not been so exposed.

140. The apparatus of claim 139 wherein said first region has a first surface area and said second region has a second surface area, and wherein said first surface area is larger than said second surface area.

141. The apparatus of claim 140 wherein said first surface area is substantially larger than said second surface area.

142. The apparatus of claim 139 wherein said color standard is substantially opaque to light.

143. The apparatus of claim 139 wherein said second region darkens in a known way when exposed to a predetermined dose of light.

144. The apparatus of claim 139 wherein said at least two different colors arranged for a simultaneous color measurement.

145. A color calibration and verification apparatus for calibrating and verifying a color measuring instrument, said apparatus comprising:
a color standard having a first surface and a second surface, said first surface having at least a first region characterized by a first predetermined coloration having premeasured color measurement value(s); and
a photosensitive layer having a first surface and a second surface, said first surface of said photosensitive layer having a second region that is photosensitive so that said second region changes color in a known way when exposed to a predetermined dose of light, the change in color distinguishing the so exposed color standard from a color standard that has not been so exposed.

146. The apparatus of claim 145 wherein said color standard and said photosensitive layer are coupled to each other such that said first and said second regions face in the same direction.

147. The apparatus of claim 146 wherein said first surface of said photosensitive layer is coupled to said second surface of said color standard.

148. The apparatus of claim 147 wherein at least a first part of said first region and a second part of said second region are arranged for a simultaneous color measurement.

149. The apparatus of claim 148 wherein said first part has a surface area that is larger than a surface area of said second part.

150. The apparatus of claim 149 wherein said first part is centrally located within said second part.

151. The apparatus of claim 149 further comprising a substantially optically opaque release liner mounted to face at least said second part to prevent at least said second part from being exposed to light before said apparatus is used.

152. The apparatus of claim 151 further comprising a sanitary layer having an optically transparent aperture, said sanitary layer being mounted between said release liner and said color standard.

153. The apparatus of claim 146 wherein said first surface of said color standard is coupled to said second surface of said photosensitive layer.

154. The apparatus of claim 153 wherein at least a first part of said first region and a second part of said second region are arranged for a simultaneous color measurement.

155. The apparatus of claim 154 wherein said first part has a surface area that is larger than a surface area of said second part.

156. The apparatus of claim 155 wherein said first part is centrally located within said second part.

157. The apparatus of claim 155 further comprising a substantially optically opaque release liner mounted to face at least said second part to prevent at least said second part from being exposed to light before said apparatus is used.

158. The apparatus of claim 157 further comprising a sanitary layer having an optically transparent aperture, said sanitary layer being mounted between said release liner and said color standard.

159. A color calibration and verification apparatus for a color measuring instrument, said apparatus comprising a color standard having a substantially opaque back surface and an additional surface that has at least one section with at least two different colors arranged for a simultaneous color measurement, a first of said colors being characterized by a first predetermined coloration having premeasured color measurement value(s) and a second of said colors being characterized by a second predetermined coloration having premeasured color measurement value(s) and being photosensitive so that it changes color in a known way when exposed to a predetermined dose of light, the change in color distinguishing the so exposed color standard from a color standard that has not been so exposed.

160. The apparatus of claim 159 wherein said at least two colors of predetermined coloration are disposed on said additional color standard surface in a known ratio of surface areas to each other.

161. The apparatus of claim 159 wherein said at least two colors of predetermined coloration are disposed on said additional color standard surface in a known configuration.

162. The apparatus of claim 161 wherein said at least two colors of predetermined coloration are disposed on said additional color standard surface with a known radial disposition.

163. The apparatus of claim 159 wherein said first color of predetermined coloration is on a central portion that is centrally located on said additional color standard surface and wherein said second color of predetermined coloration is disposed on an outer portion that is radially outside said central portion.

164. The apparatus of claim 163 wherein said central portion has a surface area that is larger than a surface area of said outer portion.

165. The apparatus of claim 163 wherein said second color of predetermined coloration is disposed on an annular portion of said additional color standard surface.

166. The apparatus of claim 161 wherein said first color of predetermined coloration is disposed on at least two noncontiguous portions on said additional color standard surface.

167. The apparatus of claim 166 wherein said second color of predetermined coloration is disposed on at least two additional noncontiguous portions on said additional color standard surface.

168. The apparatus of claim 166 wherein said colors of predetermined coloration on said additional color standard surface has an appearance selected from a group consisting of mottled, continuously graded, variegated, and any combination thereof.

169. The apparatus of claim 159 wherein said additional color standard surface has a first known portion that is one of a plurality of calibration regions disposed on said additional color standard surface.

170. The apparatus of claim 159 wherein said first predetermined coloration's premeasured color measurement value(s) in CIE Hunter Lab space (1948) color coordinates have a lightness variable L that is greater than about 80.

171. The apparatus of claim 170 wherein said first color of predetermined coloration is partially provided by applying a highly reflecting coating or gloss finish to said additional color standard surface where said first color of predetermined coloration is disposed on said additional color standard surface, but not where said second color of predetermined coloration is disposed on said additional color standard surface.

172. The apparatus of claim 159 further comprising a color standard frame or rim, said frame or rim being mountable to a sensor head of said instrument and said color standard being fastened to said frame or rim so that said additional color standard surface faces a sensor in said instrument head when said frame or rim is mounted to said head.

173. The apparatus of claim 172 wherein said color standard is permanently fastened to said frame or rim so that when said color standard is unfastened from said frame or rim in order to make a color measurement after said instrument is calibrated and said color standard and calibration is verified, said color standard will be destroyed, thereby ensuring that said color standard can only be used to perform calibration and verification once.

174. The apparatus of claim 173 wherein said color standard is fastened with adhesive to said frame or rim.

175. The apparatus of claim 174 wherein said adhesive is such that said color standard is destroyed when said color standard is unfastened from said frame in order to make a color measurement after calibration and verification is performed.

176. The apparatus of claim 172 wherein said frame or rim is a variable aperture frame, said variable aperture frame comprising:
at least one fixed frame element that does not move relative to said head when said apparatus is mounted to said head; and
at least one movable frame element.

177. The apparatus of claim 176 wherein said at least one fixed frame element to which said color standard is fastened and wherein said at least one movable frame element is used to mask a portion of said additional color standard surface.

178. The apparatus of claim 177 wherein said at least one movable frame element has at least two masking positions, each of said masking positions causing a first known portion of said additional color standard surface to be available for measuring and a second known portion of said additional color standard surface not to be available for measuring.

179. The apparatus of claim 178 wherein said movable elements comprises two semi-circular elements.

180. The apparatus of claim 179 wherein one of said masking positions is when said semi-circular elements are positioned to form a substantially closed circle causing a first known portion of said additional color standard surface to be available for measuring and a second known portion of said additional color standard surface not to be available for measuring.

181. The apparatus of claim 179 wherein one of said masking positions is when said semi-circular elements are positioned to substantially form a circle that masks one of said known regions.

182. The apparatus of claim 177 wherein said variable aperture frame comprises an iris.

183. The apparatus of claim 177 wherein said movable element is a rotatable mask having an aperture, said mask has a plurality of operable positions that correspond to respective calibration regions on said additional color standard surface.

184. The apparatus of claim 176 wherein said at least one fixed frame element is used to mask a portion of said additional color standard surface and wherein said at least one movable frame element is fastened to said color standard.

185. The apparatus of claim 159 wherein at least one of said colors is that of a skin color that is close to the color of a skin color to be measured.

186. The apparatus of claim 185 wherein said first color is that of a skin color that is close to the color of a skin color to be measured.

187. The apparatus of claim 159 wherein at least two colors of predetermined coloration are disposed on said additional color standard surface in a known ratio of said predetermined colorations to each other.

188. The apparatus of claim 177 wherein a first portion of said color standard is fastened with adhesive to said frame or rim.

189. The apparatus of claim 188 wherein said adhesive is permanent adhesive so that said color standard is destroyed when a second portion of said color standard not attached to said frame with said adhesive is unfastened from said frame in order to make a color measurement after calibration and verification is performed.

190. A color calibration and verification apparatus for a color measuring instrument, said apparatus comprising a color standard having a substantially opaque back surface and at least one section having at least two different colors arranged for a simultaneous color measurement, wherein a first of said colors is characterized by a first predetermined coloration having premeasured color measurement value(s) and wherein a second of said color is capable of changing color in a known way when exposed to a predetermined dose of light, the change in color distinguishing the so exposed color standard from a color standard that has not been so exposed, and characterized by a second predetermined coloration having premeasured color measurement value(s), said at least two colors of predetermined coloration are disposed on at least one of a first and a second color standard surfaces.

191. The apparatus of claim 190 wherein at least one of said colors is that of a skin color that is close to the color of a skin color to be measured.

192. The apparatus of claim 191 wherein said first color is that of a skin color that is close to the color of a skin color to be measured.

193. The apparatus of claim 190 wherein said at least two colors of predetermined coloration are disposed on at least one of said first and said second color standard surfaces in a known ratio of surface areas to each other.

194. The apparatus of claim 190 wherein said at least two colors of predetermined coloration are disposed on at least one of said first and said second color standard surfaces in a known ratio of said predetermined colorations to each other.

195. The apparatus of claim 190 wherein said at least two colors of predetermined coloration are disposed on at least one of said first and said second color standard surfaces in a known configuration.

196. The apparatus of claim 195 wherein said at least two colors of predetermined coloration are disposed on at least one of said first and said second color standard surfaces with a known radial disposition.

197. The apparatus of claim 190 wherein said first color of predetermined coloration is on a central portion that is centrally located on at least one of said first and said second color standard surfaces and wherein said second color of predetermined coloration is disposed on an outer portion that is radially outside said central portion.

198. The apparatus of claim 197 wherein said central portion has a surface area that is larger than a surface area of said outer portion.

199. The apparatus of claim 197 wherein said second color of predetermined coloration is disposed on an annular portion of at least one of said first and said second color standard surfaces.

200. The apparatus of claim 195 wherein said first color of predetermined coloration is disposed on at least two noncontiguous portions on at least one of said first and said second color standard surfaces.

201. The apparatus of claim 200 wherein said second color of predetermined coloration is disposed on at least two additional noncontiguous portions on at least one of said first and said second color standard surfaces.

202. The apparatus of claim 200 wherein said colors of predetermined coloration on at least one of said first and said second color standard surfaces has an appearance selected from a group consisting of mottled, continuously graded, variegated, and any combination thereof.

203. The apparatus of claim 190 wherein at least one of said first and said second color standard surfaces has a first known portion that is one of a plurality of calibration regions disposed on at least one of said first and said second color standard surfaces.

204. The apparatus of claim 190 wherein said first predetermined coloration's premeasured color measurement value(s) in CIE Hunter Lab space (1948) color coordinates have a lightness variable L that is greater than about 80.

205. The apparatus of claim 204 wherein said first color of predetermined coloration is partially provided by applying a highly reflecting coating or gloss finish to at least one of said first and said second color standard surfaces where said first color of predetermined coloration is disposed on at least one of said first and said second color standard surfaces, but not where said second color of predetermined coloration is disposed on at least one of said first and said second color standard surfaces.

206. The apparatus of claim 190 further comprising a color standard frame or rim, said frame or rim being mountable to a sensor head of said instrument and said color standard being fastened to said frame or rim so that at least one of said first and said second color standard surfaces faces a sensor in said instrument head when said frame or rim is mounted to said head.

207. The apparatus of claim 206 wherein said color standard is permanently fastened to said frame or rim so that when said color standard is unfastened from said frame or rim in order to make a color measurement after said instrument is calibrated and said color standard and calibration is verified, said color standard will be destroyed, thereby ensuring that said color standard can only be used to perform calibration and verification once.

208. The apparatus of claim 207 wherein a first portion of said color standard is fastened with adhesive to said frame or rim.

209. The apparatus of claim 207 wherein said adhesive is permanent adhesive so that said color standard is destroyed when a second portion of said color standard not attached to said frame with said adhesive is unfastened from said frame in order to make a color measurement after calibration and verification is performed.

210. The apparatus of claim 207 wherein said color standard is fastened with adhesive to said frame or rim.

211. The apparatus of claim 210 wherein said adhesive is such that said color standard is destroyed when said color standard is unfastened from said frame in order to make a color measurement after calibration and verification is performed.

212. The apparatus of claim 206 wherein said frame or rim is a variable aperture frame, said variable aperture frame comprising:

at least one fixed frame element that does not move relative to said head when said apparatus is mounted to said head; and at least one movable frame element.

213. The apparatus of claim 212 wherein said at least one fixed frame element to which said color standard is fastened and wherein said at least one movable frame element is used to mask a portion of at least one of said first and said second color standard surfaces.

214. The apparatus of claim 213 wherein said at least one movable frame element has at least two masking positions, each of said masking positions causing a first known portion of at least one of said first and said second color standard surfaces to be available for measuring and a second known portion of at least one of said first and said second color standard surfaces not to be available for measuring.

215. The apparatus of claim 214 wherein said movable elements comprises two semi-circular elements.

216. The apparatus of claim 215 wherein one of said masking positions is when said semi-circular elements are positioned to form a substantially closed circle causing a first known portion of at least one of said first and said second color standard surfaces to be available for measuring and a second known portion of at least one of said first and said second color standard surfaces not to be available for measuring.

217. The apparatus of claim 215 wherein one of said masking positions is when said semi-circular elements are positioned to substantially form a circle that masks one of said known regions.

218. The apparatus of claim 213 wherein said variable aperture frame comprises an iris.

219. The apparatus of claim 213 wherein said movable element is a rotatable mask having an aperture, said mask has a plurality of operable positions that correspond to respective calibration regions on at least one of said first and said second color standard surfaces.

220. The apparatus of claim 212 wherein said at least one fixed frame element is used to mask a portion of at least one of said first and said second color standard surfaces and wherein said at least one movable frame element is fastened to said color standard.

221. A color calibration and verification apparatus for calibration of a color measuring instrument and verification of the calibration, said apparatus comprising:

a color standard having a substantially opaque surface with at least two different colors arranged for simultaneous color measurement to sequentially calibrate the instrument with first predetermined color measurement value(s) of the color standard and verify the calibration with at least second and different predetermined color measurement value(s) of the color standard; and variance means to provide said first and at least second different color measurement values, said variance means being selected from the group consisting of: (1) means for sequential inclusion and exclusion of predetermined color measurement value(s) of a portion of said colors, (2) means for sequential exclusion and inclusion of predetermined color measurement value(s) of a portion of said colors, and (3) means for sequential exposure of photosensitive paper or material which provides at least one of said colors or portion of at least one of said colors, said photosensitive paper or material being capable of changing color in a known way when exposed to a predetermined dose of light, the change in color distinguishing the so exposed color standard from a color standard that has not been so exposed.

222. The color calibration and verification apparatus of claim 221 wherein said variance means is said means for sequential inclusion and exclusion of predetermined color measurement value(s) of a portion of said colors.

223. The color calibration and verification apparatus of claim 221 wherein said variance means is said means for sequential exclusion and inclusion of predetermined color measurement value(s) of a portion of said colors.

224. The color calibration and verification apparatus of claim 221 wherein said variance means is said means for sequential exposure of photosensitive paper or material which provides at least one of said colors or portion of at least one of said colors, said photosensitive paper or material being capable of changing color in a known way when exposed to a predetermined dose of light, the change in color distinguishing the so exposed color standard from a color standard that has not been so exposed.

225. A color standard for color calibration of a color measuring instrument and verification that said color standard used in calibration is an authorized color standard of a predetermined specification and that the calibration of the color measurement instrument has achieved predetermined specified results, wherein said standard comprises:

a surface with at least two different colors arranged for a simultaneous color measurement by said color measuring instrument, and wherein said color standard is capable of being used to so calibrate and verify by either sequential (1) exclusion and inclusion or (2) inclusion and exclusion of predetermined color measurement values of a portion of said color standard.

* * * * *